US007244300B2

(12) United States Patent
Taguchi

(10) Patent No.: US 7,244,300 B2
(45) Date of Patent: *Jul. 17, 2007

(54) INKJET RECORDING INK

(75) Inventor: Toshiki Taguchi, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/668,327

(22) Filed: Sep. 24, 2003

(65) Prior Publication Data

US 2004/0089197 A1 May 13, 2004

(30) Foreign Application Priority Data

Sep. 25, 2002 (JP) .......................... P.2002-279155

(51) Int. Cl.
*C09D 11/02* (2006.01)

(52) U.S. Cl. ................................ 106/31.49; 106/31.32

(58) Field of Classification Search ............ 106/31.49, 106/31.32

See application file for complete search history.

(56) References Cited

U.S. PATENT DOCUMENTS

| | | | | |
|---|---|---|---|---|
| 3,972,904 | A | 8/1976 | Eltz et al. | |
| 6,235,097 | B1 | 5/2001 | Kenworthy et al. | |
| 6,444,807 | B1 | 9/2002 | Wolleb et al. | |
| 6,454,845 | B1 | 9/2002 | Shawcross et al. | |
| 2002/0107301 | A1 | 8/2002 | Yamanouchi et al. | |
| 2004/0194660 | A1* | 10/2004 | Taguchi et al. | 106/31.43 |

FOREIGN PATENT DOCUMENTS

| | | | |
|---|---|---|---|
| JP | 2002-256167 | A | 9/2002 |
| JP | 2002-275386 | A | 9/2002 |
| JP | 2002-285050 | A | 10/2002 |
| JP | 2002-294097 | A | 10/2002 |
| JP | 2002-302623 | A | 10/2002 |
| JP | 2002-309118 | A | 10/2002 |
| JP | 2002-327132 | A | 11/2002 |
| JP | 2003-3086 | A | 1/2003 |
| JP | 2003-3099 | A | 1/2003 |
| JP | 2003-3109 | A | 1/2003 |
| JP | 2003-12952 | A | 1/2003 |
| JP | 2003-12956 | A | 1/2003 |
| JP | 2003-64287 | A | 3/2003 |
| JP | 2003-119415 | A | 4/2003 |
| WO | WO 00/08101 | A2 | 2/2000 |

OTHER PUBLICATIONS

Grant & Hackh's Chemical Dictionary; Fifth Edition; 1987; p. 265; no month available.*
XP-002262194—Derwent Publication—English abstract (2002).
European Search Report dated Dec. 3, 2003.

* cited by examiner

*Primary Examiner*—Helene Klemanski
(74) *Attorney, Agent, or Firm*—Sughrue Mion, PLLC

(57) ABSTRACT

An inkjet recording ink of giving an image having high image quality and excellent weather resistance is provided, which is an inkjet recording ink comprising a specific phthalocyanine dye, wherein the total amount of cations in the ink except for a lithium ion, a hydrogen ion, an ammonium ion, an organic quaternary nitrogen ion and an ion produced by the proton addition to a nitrogen atom in a basic organic material is 0.5 wt % or less.

13 Claims, No Drawings

INKJET RECORDING INK

FIELD OF THE INVENTION

The present invention relates to an inkjet recording ink which provides an image having excellent preservability and high image quality.

BACKGROUND OF THE INVENTION

Accompanying recent popularization of computers, an inkjet printer is widely used for printing letters or an image on paper, film, cloth or the like not only in offices but also at homes.

The inkjet recording method includes a system of jetting out a liquid droplet by applying a pressure using a piezo element, a system of jetting out a liquid droplet by generating a bubble in an ink under heat, a system of using an ultrasonic wave, and a system of jetting out a liquid droplet by suction using an electrostatic force. The ink composition used for such inkjet recording includes an aqueous ink, an oily ink and a solid (fusion-type) ink. Among these inks, an aqueous ink is predominating in view of production, handleability, odor, safety and the like.

The coloring agent used in such an ink for ink-jet recording is required to have high solubility in a solvent, enable high-density recording, provide good color, exhibit excellent fastness to light, heat, air, water and chemicals, ensure good fixing on an image-receiving material and less bleeding, give an ink having excellent storability, have high purity and no toxicity, and be available at a low cost. However, it is very difficult to find out a coloring agent satisfying these requirements in a high level.

Various dyes and pigments for inkjet use have been already proposed and actually used, however, a coloring agent satisfying all requirements is not yet found out at present. Conventionally well-known dyes and pigments having a color index (C.I.) number can hardly satisfy both color hue and fastness required of the ink for ink-jet recording.

On the other hand, the cyan ink is found to have problems in that the dye is low in the solubility and readily precipitates and when a letter is printed, an abnormal printing area as if the dye is aggregated (a bronze part; a trouble such that the film property is changed and becomes mat as compared with the normal printing area) is generated in the high-density printing area to deteriorate the image quality.

SUMMARY OF THE INVENTION

An object of the present invention is to provide an inkjet recording ink capable of giving an image having high image quality and at the same time, excellent weather resistance such as light fastness, heat fastness and ozone fastness.

The object of the present invention can be attained by the inkjet recording ink described in the following items.

1. An inkjet recording ink comprising an aqueous medium having dissolved or dispersed therein a dye represented by the following formula (I), wherein the total amount of a cation in said ink except for a lithium ion, a hydrogen ion, an ammonium ions an organic quaternary nitrogen ion and an ion produced by the proton addition to a nitrogen atom in a basic organic material is 0.5 wt % or less;

Formula (I)

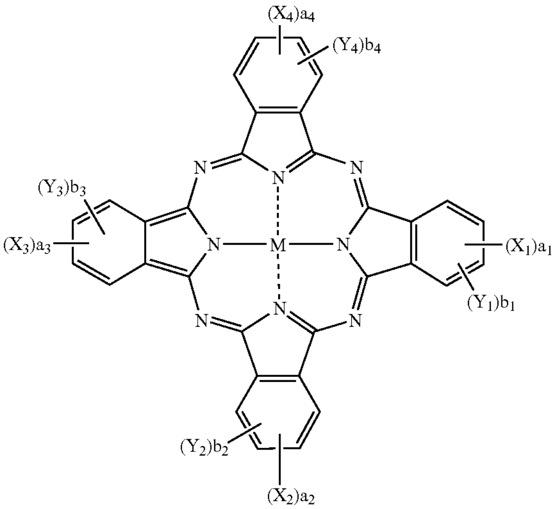

wherein $X_1$, $X_2$, $X_3$ and $X_4$ each independently represents —SO-Z, —$SO_2$-Z, —$SO_2NR_1R_2$, a sulfo group, —$CONR_1R_2$ or —$CO_2R_1$; Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; $R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, and when a plurality of Zs are present, the Zs may be the same or different; $Y_1$, $Y_2$, $Y_3$ and $Y_4$ each independently represents a monovalent substituent, and when a plurality of $X_1$s, $X_2$s, $X_3$s, $X_4$s, $Y_1$s, $Y_2$s, $Y_3$s or $Y_1$s are present, the $X_1$s, $X_2$s, $X_3$s, $X_4$s, $Y_1$s $Y_2$s, $Y_3$s or $Y_4$s may be the same or different; $a_1$ to $a_4$ and $b_1$ to $b_4$ represent the number of substituents $X_1$ to $X_4$ and $Y_1$ to $Y_4$, respectively; $a_1$ to $a_4$ each independently represents an integer of 0 to 4 but all of $a_1$ to $a_4$ are not 0 at the same time; $b_1$ to $b_4$ each independently represents an integer of 0 to 4; M represents a hydrogen atom, a metal atom, or an oxide, hydroxide or halide thereof.

2. The inkjet recording ink as described in the item 1, wherein the dye represented by formula (I) is a dye represented by the following formula (II):

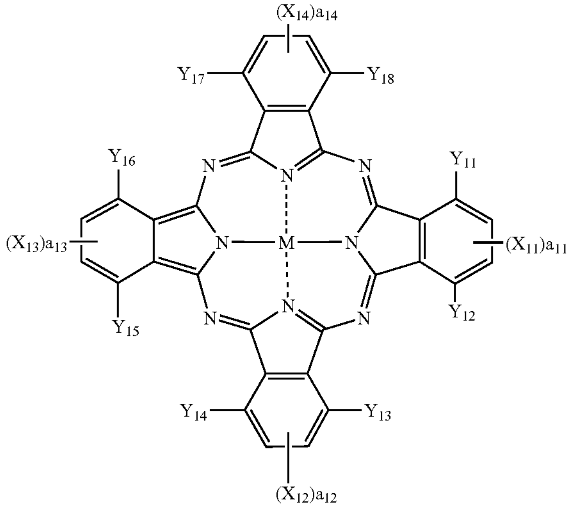

wherein $X_{11}$ to $X_{14}$, $Y_{11}$ to $Y_{18}$ and M have the same meanings as $X_1$ to $X_4$, $Y_1$ to $Y_4$ and M in the formula (I), respectively, and $a_{11}$ to $a_{14}$ each independently represents an integer of 1 or 2.

3. The inkjet recording ink as described in the item 1 or 2, which comprises at least one of a lithium ion and a hydrogen ion.

4. The inkjet recording ink as described in any one of the items 1 to 3, wherein the cation in said ink except for a lithium ion, a hydrogen ion, an ammonium ion, an organic quaternary nitrogen ion and an ion produced by the proton addition to a nitrogen atom in a basic organic material is at least one selected from the group consisting of a potassium ion, a sodium ion, a cesium ion, a magnesium ion, a zinc ion, a calcium ion, a strontium ion, an aluminum ion and a transition metal ion.

5. The inkjet recording ink as described in any one of the items 1 to 3, wherein the cation in said ink except for a lithium ion, a hydrogen ion, an ammonium ion, an organic quaternary nitrogen ion and an ion produced by the proton addition to a nitrogen atom in a basic organic material is at least one of a potassium ion and a sodium ion.

DETAILED DESCRIPTION OF THE INVENTION

The present invention is described in detail below.

The cations contained in the inkjet recording ink of the present invention are preferably a lithium ion, a hydrogen ion, an ammonium ion, an organic quaternary nitrogen ion and an ion produced by the proton addition to a nitrogen atom in a basic organic material (hereinafter, these are called cations of the present invention).

Examples of the organic quaternary nitrogen ion include tetramethylammonium ion, tetraethylammonium ion, tetrabutylammonium ion, benzyltrimethylammonium ion, benzyltributylammonium ion, cetylpyridinium ion, cetyltrimethylammonium ion, N,N'-dimethylpiperidinium ion and N,N'-dimethylimidazolium ion.

The nitrogen atom in a basic organic material indicates, for example, a nitrogen contained in trimethylamine, triethylamine, triethanolamine, methylamine, dimethylamine, butylamine, dibutylamine, piperidine, morpholine, piperazine, pyrrolidine, N-methylpiperidine, N-methylmorpholine, pyridine, quinoline, pyrazine, pyrimidine, pyrazole and imidazole.

Among these, the cation components contained in the ink are preferably a hydrogen ion and a lithium ion.

The ink of the present invention is characterized in that the total amount of cations in the ink except for those described above is 0.5 wt % or less.

Examples of the cation except for those described above include a potassium ion, a sodium ion, a cesium ion, a magnesium ion, a zinc ion, a calcium ion, a strontium ion, an aluminum ion and a transition metal ion.

When the total amount of these cations increases in the ink, precipitation of dye in the ink or in the printing part occurs and this is not preferred. In this meaning, the total amount of these ions must be 0.5 wt % or less and is preferably 0.1 wt % or less.

The ion component in the ink is mainly originated in a counter ion of an ionic group of the dye and in additives such as surfactant, pH adjusting agent and antiseptic. The cation amount can be controlled by appropriately selecting the counter ion of the dye or the kind and amount of the additives.

A method for measuring an amount of a cation in the ink can use vairous conventional analytical methods, e.g., an ion chromatography method, an atomic absorption method, a plasma emission spectrometry method (ICP).

The inkjet recording ink of the present invention contains at least one phthalocyanine dye represented by formula (I). The phthalocyanine dye is known as a dye having fastness but also known to exhibit poor fastness to ozone gas when used as a dye for inkjet recording.

In the present invention, an electron withdrawing group is preferably introduced into the phthalocyanine skeleton to have an oxidation potential nobler than 1.0 V (vs SCE) and thereby reduce the reactivity with ozone which is an electrophilic agent. A nobler oxidation potential is more preferred and the oxidation potential is preferably nobler than 1.1 V (vs SCE) and most preferably nobler than 1.2 V (vs SCE).

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikaqaku Sokutei Ho* (*Electrochemical Measuring Method*), Gihodo Shuppan Sha (1984).

More specifically, a test sample is dissolved to a concentration of $1\times10^{-4}$ to $1\times10^{-6}$ mol/liter in a solvent such as dimethylformamide or acetonitrile containing a supporting electrolyte such as sodium perchlorate or tetrapropylazmonium perchlorate and the oxidation potential is measured as a value to SCE (saturated calomel electrode) by using a cyclic voltammetry or a direct current polarography. This value sometimes deviates on the order of tens of millivolt due to the effect of liquid junction potential, liquid resistance of the sample solution, or the like, however, the reproducibility of potential can be guaranteed by adding a standard sample (for example, hydroquinone).

In order to univocally specify the potential, in the present invention, the value (vs SCE) measured by a direct current polarography in a dimethylformamide (concentration of dye: 0.001 Mol $dm^{-3}$) containing 0.1 mol $dm^3$ of tetrapropylammonium perchlorate as the supporting electrolyte is used as the oxidation potential of the dye.

The Eox (oxidation potential) value indicates the transferability of an electron from the sample to the electrode and as the value is larger (the oxidation potential is nobler), the electron is less transferable from the sample to the electrode, in other words, the oxidation less occurs. As for the relationship with the structure of compound, the oxidation potential becomes nobler by introducing an electron withdrawing group and becomes baser by introducing an electron donating group. In the present invention, the oxidation potential is preferably rendered nobler by introducing an electron withdrawing group into the phthalocyanine skeleton so as to reduce the reactivity with ozone which is an electrophilic agent. Accordingly, when this is described using the Hammett's substituent constant σp value as a measure for the electron withdrawing property or electron donating property of a substituent, the oxidation potential can be rendered nobler by introducing a substituent having a large σp value, such as sulfinyl group, sulfonyl group and sulfamoyl group.

Also from the standpoint of controlling the oxidation potential as such and thereby improving the fastness, the phthalocyanine dye represented by formula (I) is preferred.

In formula (I), $X_1$, $X_2$, $X_3$ and $X_4$ each independently represents —SO-Z, —$SO_2$-Z, —$SO_2NR_1R_2$, a sulfo group, —$CONR_1R$, or —$CO_2R_1$. Among these substituents, preferred are —SO-Z, —$SO_2$-Z, —$SO_2NR_1R_2$ and —$CONR_1R_2$, more preferred are —$SO_2$-Z and —$SO_2NR_1R_2$, and most preferred is —$SO_2$-Z. In the case where any one of $a_1$ to $a_4$ showing the number of substituents represents a number of 2 or more, any one of $X_1$ to $X_4$ is present as a plurality of substituents and these may be the same or different and each independently represents any one of the above-described groups. $X_1$, $X_2$, $X_3$ and $X_4$ may be completely the same substituents, may be substituents of the same kind but partially different as in the case, for example, where $X_1$, $X_2$, $X_3$ and $X_4$ all are —$SO_2$—Z and Zs are different from each other, or may include substituents different from each other, for example, —$SO_2$-Z and —$SO_2NR_1R_2$.

Each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

$R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a hydrogen atom, a substituted or unsubstituted alkyl group, a substituted or unsubstituted aryl group, or a substituted or unsubstituted heterocyclic group, most preferably a hydrogen atom, a substituted alkyl group, a substituted aryl group or a substituted heterocyclic group. However, it is not preferred that $R_1$ and $R_2$ both are a hydrogen atom.

The substituted or unsubstituted alkyl group represented by $R_1$, $R_2$ and Z is preferably an alkyl group having from 1 to 30 carbon atoms and from the reason that the solubility of dye and the stability of ink are enhanced, the alkyl group is more preferably a branched alkyl group, still more preferably an alkyl group having an asymmetric carbon (use in the racemic form). Examples of the substituent include those described later as the substituent when Z, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkyl group may be substituted by a halogen atom or an ionic hydrophilic group. Incidentally, the number of carbon atoms in the alkyl group does not contain carbon atoms of substituents and this applies to other groups.

The substituted or unsubstituted cycloalkyl group represented by $R_1$, $R_2$ and Z is preferably a cycloalkyl group having from 5 to 30 carbon atoms, more preferably a cycloalkyl group having an asymmetric carbon (use in the racemic form) because the solubility of dye and the stability of ink are enhanced. Examples of the substituent include those described later as the substituent when Z, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the cycloalkyl group may be substituted by a halogen atom or an ionic hydrophilic group.

The substituted or unsubstituted alkenyl group represented by $R_1$, $R_9$ and Z is preferably an alkanyl group having from 2 to 30 carbon atoms and from the reason that the solubility of dye and the stability of ink are improved, the alkenyl group is more preferably a branched alkenyl group, still more preferably an alkenyl group having an asymmetric carbon (use in the racemic form). Examples of the substituent include those described later as the substituent when Z, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkenyl group may be substituted by a halogen atom or an ionic hydrophilic group.

The substituted or unsubstituted aralkyl group represented by $R_1$, $R_2$ and Z is preferably an aralkyl group having from 7 to 30 carbon atoms and from the reason that the solubility of dye and the stability of ink are improved, the aralkyl group is more preferably a branched aralkyl group, still more preferably an aralkyl group having an asymmetric carbon (use in the racemic form). Examples of the substituent include those described later as the substituent when Z. $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the aralkyl group may be substituted by a halogen atom or an ionic hydrophilic group.

The substituted or unsubstituted aryl group represented by $R_1$, $R_2$ and Z is preferably an aryl group having from 6 to 30 carbon atoms. Examples of the substituent include those described later as the substituent when Z, $R_1$, $R_2$, $Y_1$, $Y_2$, $Y_3$ and $Y_4$ can further have a substituent. In particular, an electron withdrawing group is preferred because the dye can be noble in the oxidation potential and improved in the fastness. Examples of the electron withdrawing group include those having a positive Hammett's substituent constant σp value. Among these, preferred are a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group and a quaternary ammonium group, more preferred are a cyano group, a carboxyl group, a sulfamoyl group, a carbamoyl group, a sulfonyl group, an imido group an acyl group, a sulfo group and a quaternary ammonium group.

The heterocyclic group represented by $R_1$, $R_2$ and Z is preferably a 5- or 6-membered ring and the ring may be further condensed. Also, the heterocyclic group may be an aromatic heterocyclic group or a non-aromatic heterocyclic group. Examples of the heterocyclic group represented by $R_1$, $R_2$ and Z are shown below in the form of a heterocyclic ring by omitting the substitution site. The substitution site is not limited and for example, pyridine may be substituted at the 2-position, 3-position and 4-position. Examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole. These groups each may have a substituent and examples of the substituent include those described later as the substituent when Z, $R_1$, $R_2$, $Y_1$, $Y_2$, $Y_3$ and $Y_4$ can further have a substituent. Preferred substituents are the same as the above-described substituents of the aryl group and more preferred substituents are the same as the above-described more preferred substituents of the aryl group.

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group. These substituents each may further have a substituent.

Among these, preferred are a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group and a sulfo group, more preferred are a hydrogen atom, a halogen atom, a cyano group, a carboxyl group and a sulfo group, and most preferred is a hydrogen atom.

When Z, $R_1$, $R_2$, $Y_1$, $Y_2$, $Y_3$ and $Y_4$ each is a group which can further have a substituent, these may further have the following substituent.

Examples of the substituent include a linear or branched alkyl group having from 1 to 12 carbon atoms, a linear or branched aralkyl group having from 7 to 18 carbon atoms, a linear or branched alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (these groups each is preferably a group having a branched chain, tore preferably a group having an asymmetric carbon, because the solubility of dye and the stability of ink are improved; specific examples thereof include methyl, ethyl, propyl, isopropyl, sec-butyl, tert-butyl, 2-ethylhexyl, 2-methylsulfonylethyl, 3-phenoxypropyl, trifluoromethyl, cyclopentyl), a halogen atom (e.g., chlorine, bromine), an aryl group (e.g., phenyl, 4-tertbutylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxyl 2-methoxyethoxy, 2-methanesulfonylethoxy), an aryloxy group (e.g., phenoxy, 2-methylphenoxy, 4-tertbutylphenoxy, 3-nitrophenoxy, 3-tert-butyloxycarbamoylphenoxy, 3-methoxycarbamoyl), an acylamino group (e.g., acetamido, benzamido, 4-(3-tert-butyl-4-hydroxyphenoxy) butanamido), an alkylamino group (e.g., methylamino, butylamino, diethylamino, methylbutylamino), an anilino group (erg., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydro-pyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g, carboxyl, sulfo, phosphono, quaternary ammonium).

In the case where the phthalocyanine dye represented by formula (I) is water-soluble, the dye preferably has an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in the form of a salt and examples of the counter ion for forming the salt include an ammonium ion, alkali metal ions (e.g., lithium ion, sodium ion, potassium ion) and organic cations (e.g., tetrauethylammonium ion, tetramethylguanidium ion, tetramethylphosphonium). Among these counter ions, a lithium ion is preferred because this ion enhances the solubility of dye and improves the stability of ink.

As for the number of ionic hydrophilic groups, the phthalocyanine dye preferably has at least two ionic hydrophilic groups, more preferably at least two sulfo groups and/or carboxyl groups, within one molecule.

$a_1$ to $a_4$ and $b_1$ to $b_4$ represent the number of substituents $X_1$ to $X_4$ and $Y_1$ to $Y_4$, respectively. $a_1$ to $a_4$ each independently represents an integer of 0 to 4 but all are not 0 at the same time. $b_1$ to $b_4$ each independently represents an integer of 0 to 4. When any one of $a_1$ to $a_4$ and b, to $b_4$ represents a number of 2 or more, any one of $X_1$ to $X_4$ and $Y_1$ to $Y_4$ is present as a plurality of substituents and these may be the same or different.

$a_1$ and $b_1$ satisfy the relationship of $a_1+b_1=4$. In particular, a combination that $a_1$ represents 1 or 2 and $b_1$ represents 3 or 2 is preferred, and a combination that $a_1$ represents 1 and $b_1$ represents 3 is most preferred.

The same relationship as that between $a_1$ and $b_1$ is present in each of the pairs $a_2$ and $b_2$, $a_3$ and $b_3$, and $a_4$ and $b_4$, and the preferred combination is also the same.

M represents a hydrogen atom, a metal element or an oxide, hydroxide or halide thereof.

M is preferably a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, an oxide such as VO and GeO, a hydroxide such as $Si(OH)_{21}$ $Cr(OH)_2$ and $Sn(OH)_2$ or a halide such as AlCl, $SiCl_2$, VCl, $VCl_2$, VOCl, FeCl, GaCi and ZrCl.

Among these, preferred are Cu, Ni, Zn and Al, and most preferred is Cu.

Also, Pc (phthalocyanine ring) may form a dimer (for example, Pc-M-LM-Pc) or a trimer through L (divalent linking group). At this time, Ms may be the same or different.

The divalent linking group represented by L is preferably an oxy group —O—, a thio group —S—, a carbonyl group —CO—, a sulfonyl group —$SO_2$—, an imino group —NH—, a methylene group —$CH_2$— or a group formed by combining two or more of these groups.

As for the preferred combination of substituents in the compound represented by formula (I), a compound where at least one of various substituents is the preferred group is preferred, a compound where a larger number of various substituents are the preferred groups is more preferred, and a compound where all substituents are the preferred groups is most preferred.

Among the phthalocyanine dyes represented by formula (I), a phthalocyanine dye having a structure represented by formula (II) is preferred.

The phthalocyanine dye represented by formula (II) of the present invention is described in detail below.

In formula (II), $X_{11}$ to $X_{14}$ and $Y_{11}$ to $Y_{18}$ have the same meanings as $X_1$ to $X_4$ and $Y_1$ to $Y_4$ in formula (I), respectively, and preferred examples are also the same. M has the same meaning as M in formula (I) and preferred examples are also the same.

In formula (II), $a_{11}$ to $a_{14}$ each independently represents an integer of 1 or 2 and preferably satisfy $4<a_{11}+a_{12}+a_{13}+a_{14}<6$, and $a_{11}=a_{12}=a_{13}=a_{14}=1$ is more preferred.

$X_{11}$, $X_{12}$, $X_{13}$ and $X_{14}$ may be completely the same substituents, may be substituents of the same kind but partially different as in the case, for example, where $X_{11}$, $X_{12}$, $X_13$ and $X_{14}$ all are —$SO_2$-Z and Zs are different from each other, or may include substituents different from each other, for example, —$SO_2$-Z and —$SO_2NR_1R_2$.

In the phthalocyanine dye represented by formula (II), the following combination of substituents is particularly preferred.

$X_{11}$ to $X_{14}$ each independently represents preferably —SO-Z, —$SO_2$-Z, —$SO_2NR_1R_2$ or —$COMR_1R_2$, more preferably —$SO_2Z$ or —$SO_2NR_1R_2$, most preferably —$SO_2$-Z.

Each Z independently represents preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$R_1$ and $R_2$ each independently represents preferably a hydrogen atom, a substituted or unsubstituted alkyl group, a substituted or unsubstituted aryl group or a substituted or unsubstituted heterocyclic group, and most preferably a hydrogen atom, a substituted alkyl group, a substituted aryl group or a substituted heterocyclic group. However, it is not preferred that $R_1$ and $R_2$ both are a hydrogen atom. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$Y_{11}$ to $Y_{19}$ each independently represents preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

$a_{11}$ to $a_{14}$ each independently represents preferably 1 or 2 and it is particularly preferred that all are 1.

M represents a hydrogen atom, a metal element or an oxide, hydroxide or halide thereof, preferably Cu, Ni, Zn or Al, and most preferably Cu.

In the case where the phthalocyanine dye represented by formula (II) is water-soluble, the dye preferably has an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in the form of a salt and examples of the counter ion for forming the salt include an ammonium ion, alkali metal ions (e.g., lithium ion, sodium ion, potassium ion) and organic cations (e.g., tetramethylammonium ion, tetramethylguanidium ion, tetramethylphosphonium). Among these counter ions, a lithium ion is preferred because this ion enhances the solubility of dye and improves the stability of ink.

As for the number of ionic hydrophilic groups, the phthalocyanine dye preferably has at least two ionic hydrophilic groups, more preferably at least two sulfo groups and/or carboxyl groups, within one molecule.

As for the preferred combination of substituents in the compound represented by formula (II), a compound where at least one of various substituents is the preferred group is preferred, a compound where a larger number of various substituents are the preferred groups is more preferred, and a compound where all substituents are the preferred groups is most preferred.

As for the chemical structure of the phthalocyanine dye of the present invention, at least one electron withdrawing group such as sulfinyl group, sulfonyl group and sulfamoyl group is preferably introduced into respective four benzene rings of phthalocyanine such that the total of $\sigma p$ values of the substituents in the entire phthalocyanine skeleton becomes 1.6 or more.

The Hammett's substituent constant $\sigma p$ value is briefly described here. The Hammett's rule is a rule of thumb advocated by L. P. Hammett in 1935 so as to quantitatively discuss the effect of substituent on the reaction or equilibrium of benzene derivatives and its propriety is widely admitted at present. The substituent constant determined by the Hammett's rule includes a $\sigma p$ value and a $\sigma m$ value and these values can be found in a large number of general publications but these are described in detail, for example, in J. A. Dean (compiler), *Lange's Handbook of Chemistry,* 12th ed., McGraw-Hill (1979), and *Kagakuno Ryoiki* (*Chemistry Region*), special number, No. 122, pp. 96-103, Nankodo (1979).

Generally, in view of the synthesis method, the phthalocyanine derivative represented by formula (I) is inevitably a mixture of analogues differing in the site where the substituents Xn (n=1 to 4) and Ym (m=1 to 4) are introduced and in the number of the substituents introduced. Accordingly, these analogue mixtures are statistically averaged and represented by a formula in many cases. In the present invention, it has been found that when these analogue mixtures are classified into the following three types, a specific mixture is particularly preferred. The phthalocyanine-base dye analogue mixtures represented by formulae (I) and (II) are defined by classifying these into the following three types based on the substitution site.

(1) β-Position Substitution Type:

A phthalocyanine dye having specific substituents at the 2- and/or 3-position, the 6- and/or 7-position, the 10- and/or 11-position, and the 14- and/or 15-position.

(2) α-position Substitution Type:

A phthalocyanine dye having specific substituents at the 1- and/or 4-position, the 5- and/or 8-position, the 9 and/or 12-position, and the 13- and/or 16-position.

(3) α,β-Position Mixed Substitution Type:

A phthalocyanine dye having specific substitutions at the 1- to 16-positions without any regularity.

In the present invention, phthalocyanine dye derivatives different in the structure (particularly in the substitution site) are described by using these β-position substitution type, α-position substitution type and α,β-position mixed substitution type.

The phthalocyanine derivative for use in the present invention can be synthesized by combining the methods described or cited, for example, in Shirai and Kobayashi, *Phthalocyanine—Kagaku to Kino—*(*Phthalocyanine—Chemistry and Function—*), pp. 1-62, IPC, and C. C. Leznoff and A. B. P. Lever, *Phthalocyanines—Properties and Applications*, pp. 1-54, VCH, or methods analogous thereto.

The phthalocyanine compound represented by formula (I) of the present invention can be synthesized, for example, through sulfonation, sulfonyl chloridation and amidation of an unsubstituted phthalocyanine compound as described in International Patents 00/17275, 00/08103, 00/08101 and 98/41853 and JP-A-10-36171 (the term "JP-A" as used herein means an "unexamined published Japanese patent application"). In this case, sulfonation may take place at any site of the phthalocyanine nucleus and the number of sites sulfonated is difficult to control. Accordingly, when a sulfo group is introduced under such reaction conditions, the site and number of sulfo groups introduced into the product cannot be specified and a mixture of those different in the number of substituents or in the substitution site inevitably results. If the compound of the present invention is synthesized starting from such a product, the compound of the present invention is obtained as an α,β-position mixed substitution type mixture containing several kinds of compounds different in the number of substituents or in the substitution site because the number of sulfamoyl groups substituted on the heterocyclic ring or their substitution sites cannot be specified.

As described above, for example, when many electron withdrawing groups such as sulfamoyl group are introduced into the phthalocyanine nucleus, the oxidation potential becomes nobler and the ozone resistance is increased. However, according to the above-described synthesis method, a phthalocyanine dye where the number of electron withdrawing groups introduced is small, namely, the oxidation potential is baser, is inevitably mingled. Accordingly, in order to improve the ozone resistance, it is preferred to use a synthesis method where the production of a compound having a baser oxidation potential is suppressed.

The phthalocyanine compound represented by formula (II) of the present invention can be synthesized, for example, by reacting a phthalonitrile derivative (Compound P) shown below and/or a diiminoisoindoline derivative (Compound Q) shown below with a metal derivative represented by formula (II) or may be derived from a tetrasulfophthalocyanine compound obtained by reacting a 4-sulfophthalonitrile derivative (Compound R) shown below with a metal derivative represented by formula (III).

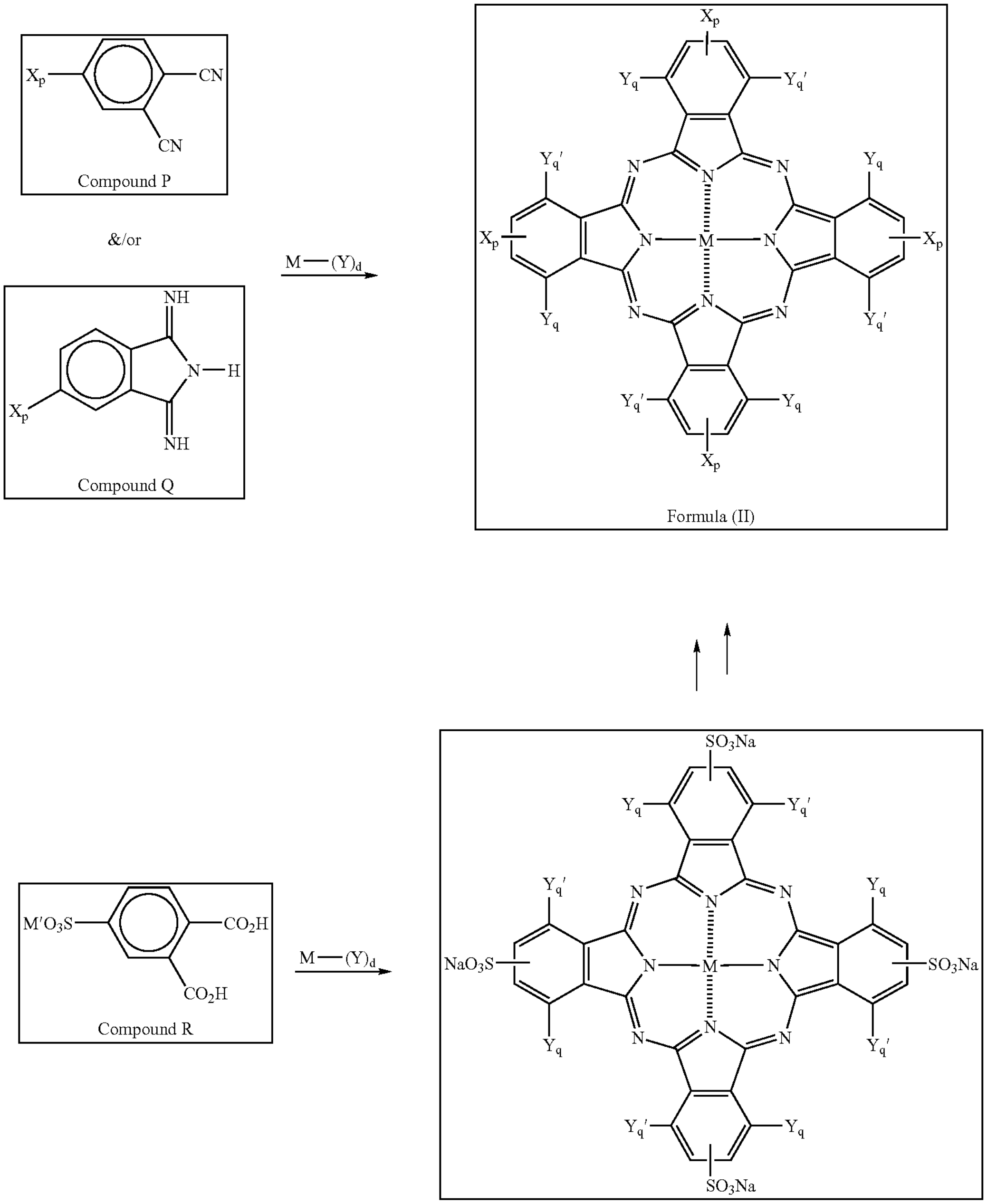

In the formulae above, $X_p$ corresponds to $X_{11}$, $X_{12}$, $X_{13}$ or $X_{14}$ in formula (II) and $Y_q$ and $Y_{q'}$ each corresponds to $Y_{11}$, $Y_{12}$, $Y_{13}$, $Y_{14}$, $Y_{15}$, $Y_{16}$, $Y_{17}$ or $Y_{18}$ in formula (II). In Compound R, M' represents cation.

Examples of the cation represented by M' include alkali metal ions such as Li, Na and K, and organic cations such as triethylammonium ion and pyridinium ion. Formula (III):

$$M\text{-}(Y)_d$$

wherein M has the same meaning as M in formulae (I) and (II), Y represents a monovalent or divalent ligand such as halogen atom, acetate anion, acetylacetonate and oxygen, and d represents an integer of 1 to 4.

That is, according to this synthesis method, a specific number of desired substituents can be introduced. Particularly, in the case of introducing a large number of electron withdrawing groups so as to render the oxidation potential nobler as in the present invention, this synthesis method is very excellent as compared with the above-described method for synthesizing the phthalocyanine compound of formula (I).

The thus-obtained phthalocyanine compound represented by formulae (II) is usually a mixture of compounds represented by the following formulae (a)-1 to (a)-4 which are isomers with respect to the substitution site of each $X_p$, namely, a β-position substitution type.

Formula (a)-1:

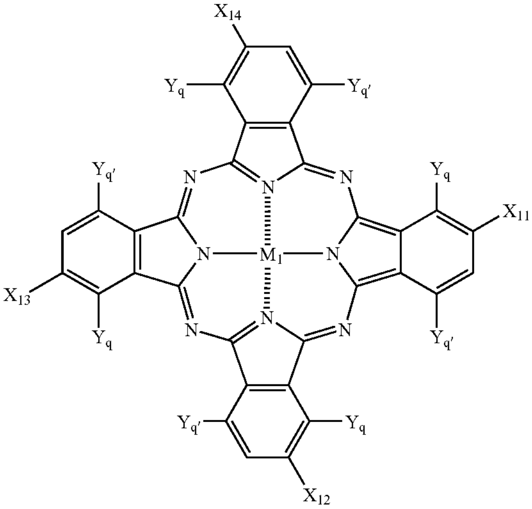

Formula (a)-2:

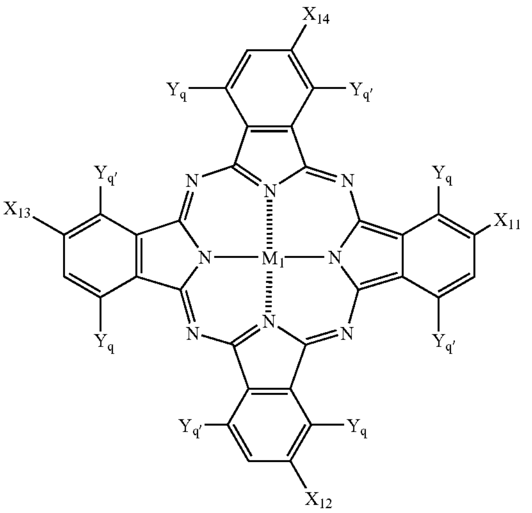

Formula (a)-3:

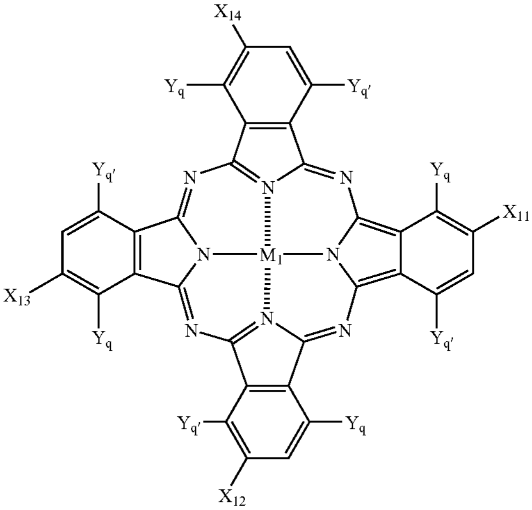

-continued

Formula (a)-4:

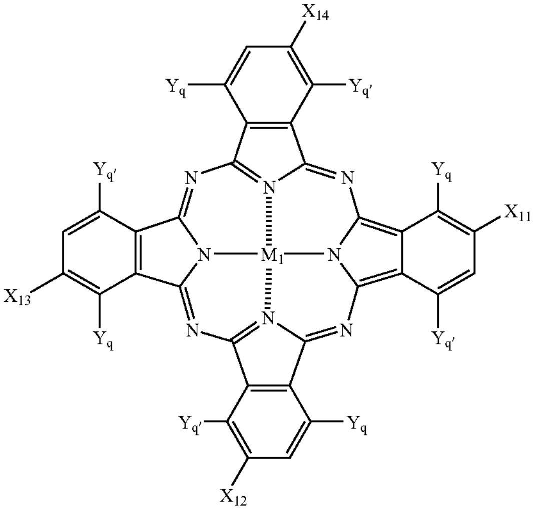

In the synthesis method above, when all $X_p$ are the same, a β-position substitution type phthalocyanine dye where $X_{11}$, $X_{12}$, $X_{13}$ and $X_{14}$ are completely the same substituents can be obtained. On the other hand, when $X_p$ are different, a dye having substituents of the same kind but partially different from each other or a dye having substituents different from each other can be synthesized. Among the dyes of formula (II), these dyes having electron withdrawing substituents different from each other are preferred because the solubility and aggregating property of dye and the aging stability of ink can be controlled.

In the present invention, it has been found very important in any substitution type for the improvement of fastness that the oxidation potential is nobler than 1.0 V (vs SCE). The great effect thereof cannot be expected at all from the above-described known techniques. Furthermore, although the reason is not particularly known, there is a tendency that the β-position substitution type is apparently more excellent in the color hue, light fastness, ozone gas resistance and the like than the α,β-position mixed substitution type.

Specific examples (Compounds I-1 to I-12 and 101 to 190) of the phthalocyanine dyes represented by formulae (I) and (II) are set forth below, however, the phthalocyanine dye for use in the present invention is not limited to the following examples.

(I-1)
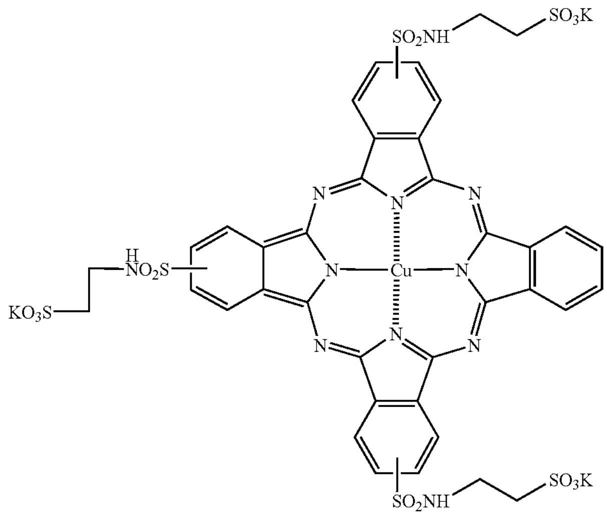
(I-2)
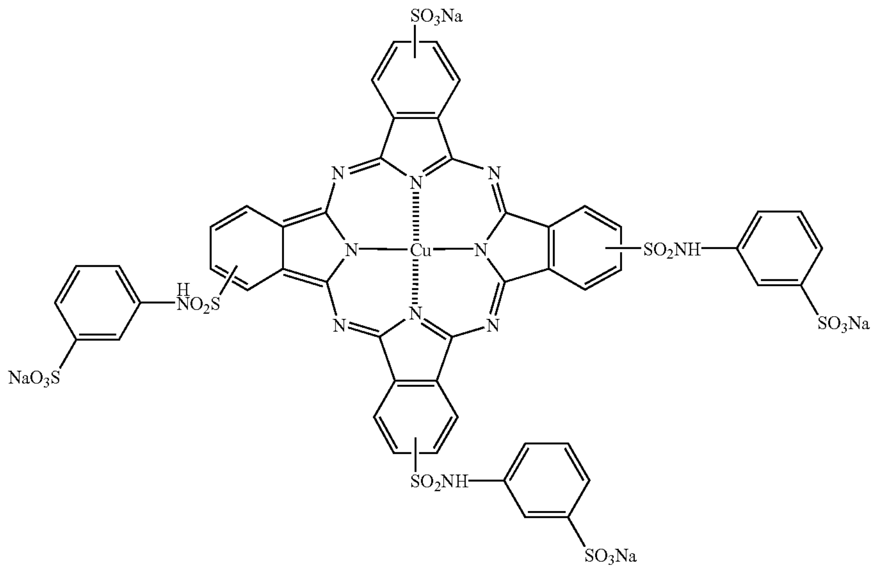
(I-3)
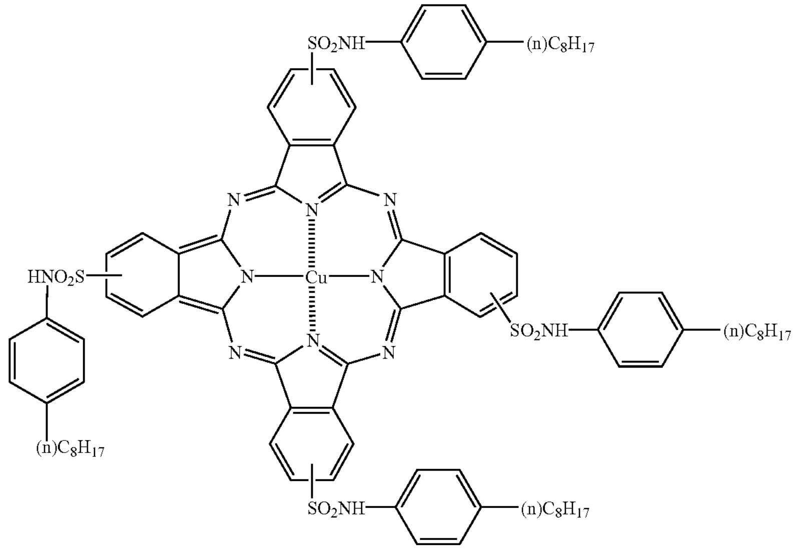

-continued
(I-4)
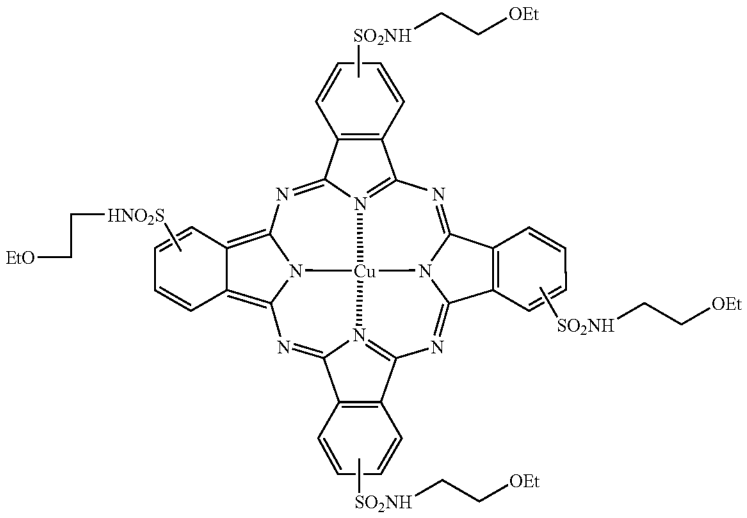
(I-5)
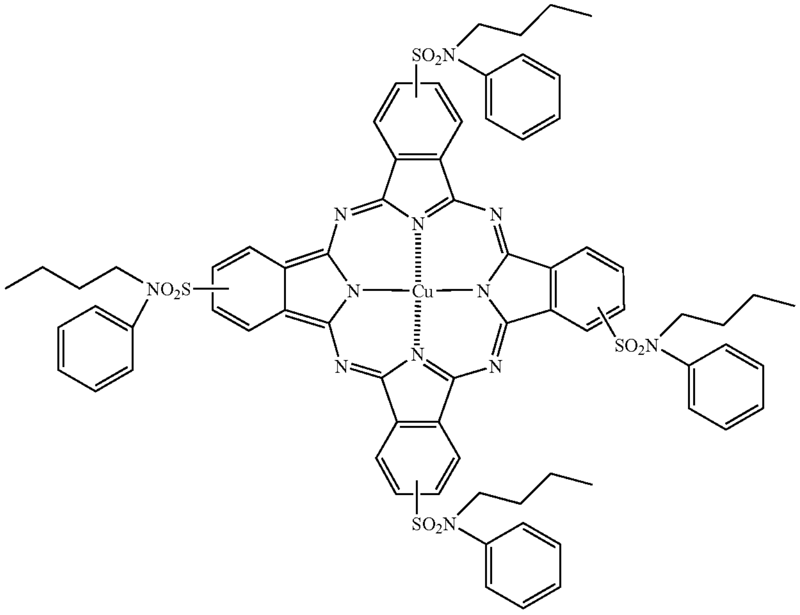

-continued
(I-6)
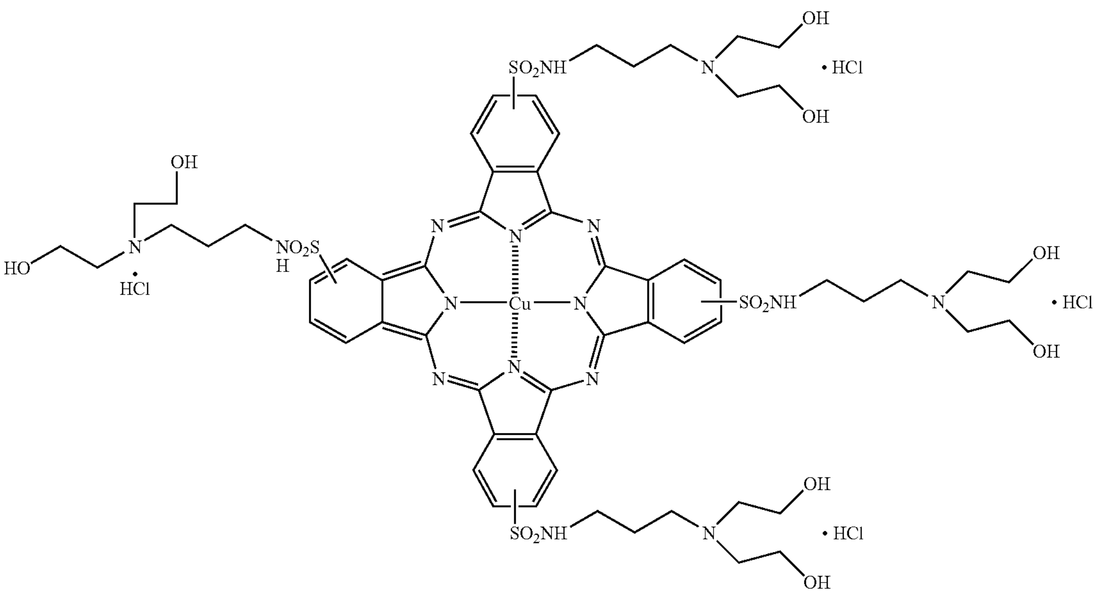
(I-7)
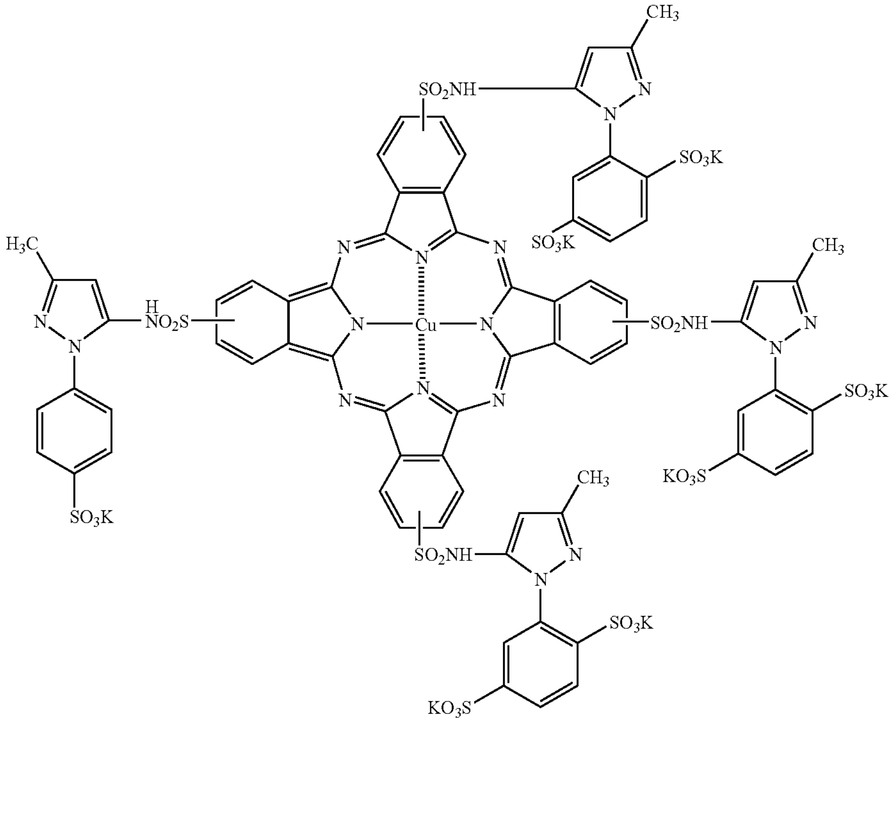

-continued
(I-8)
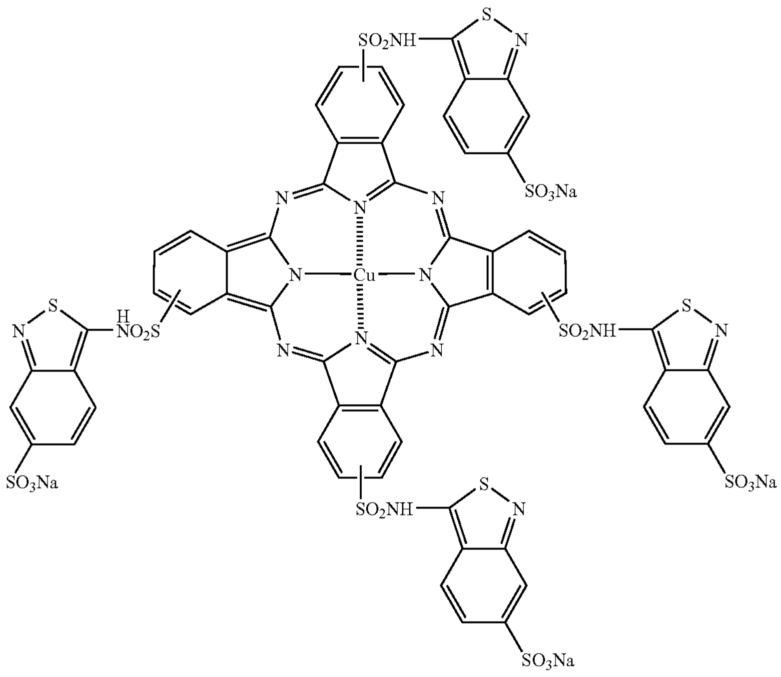
(I-9)
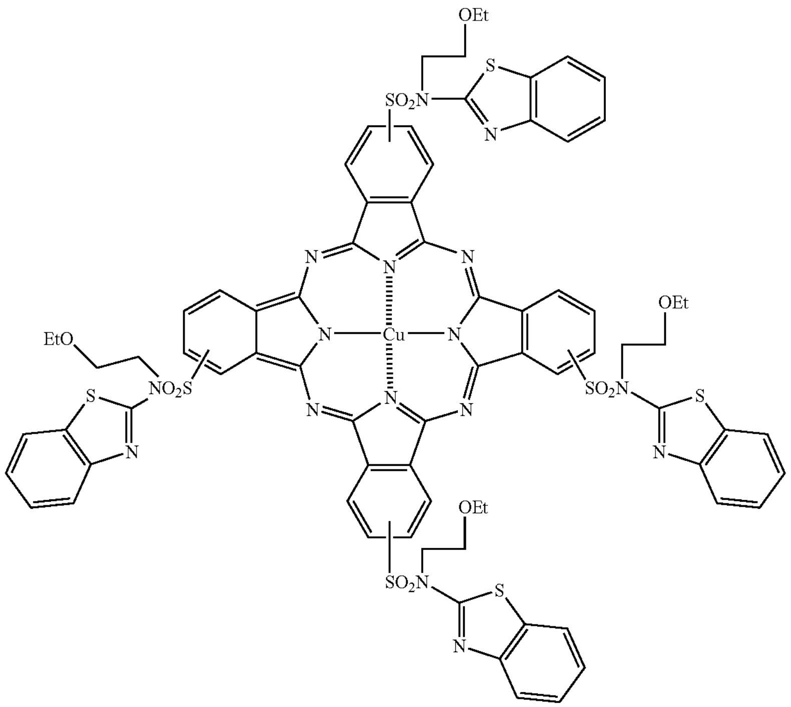

-continued
(I-10)
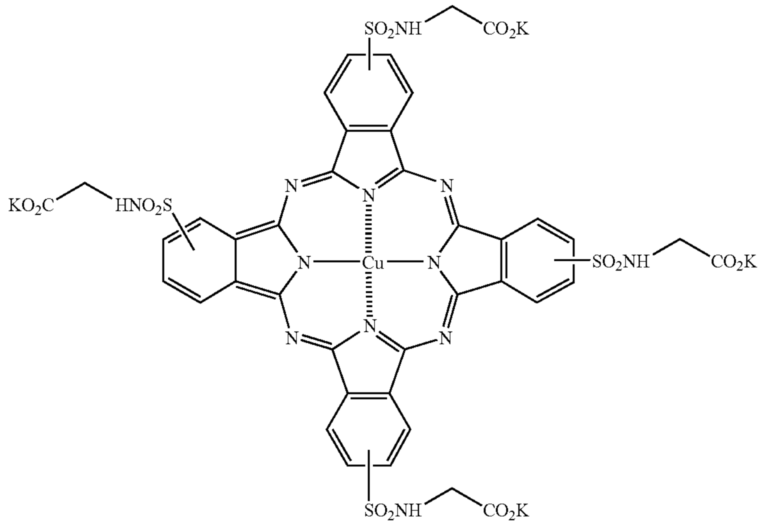
(I-11)
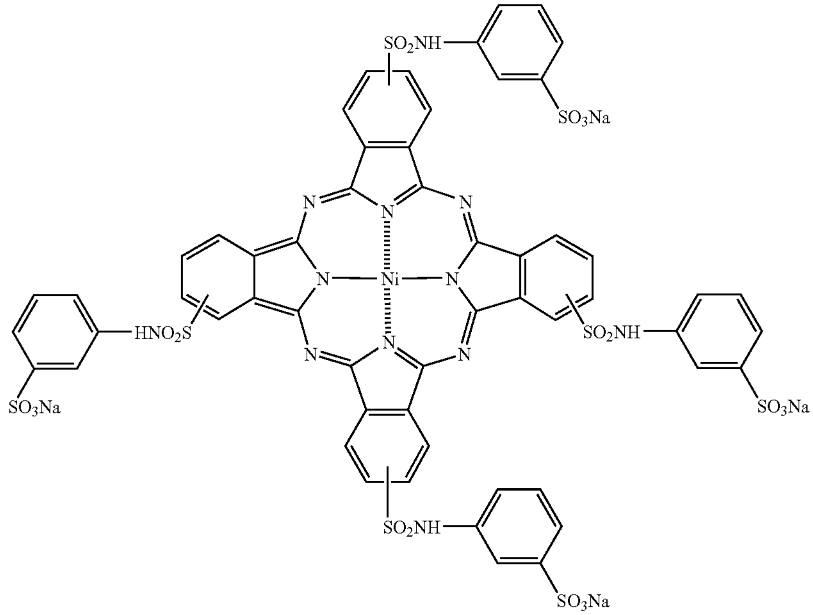

-continued
(I-12)
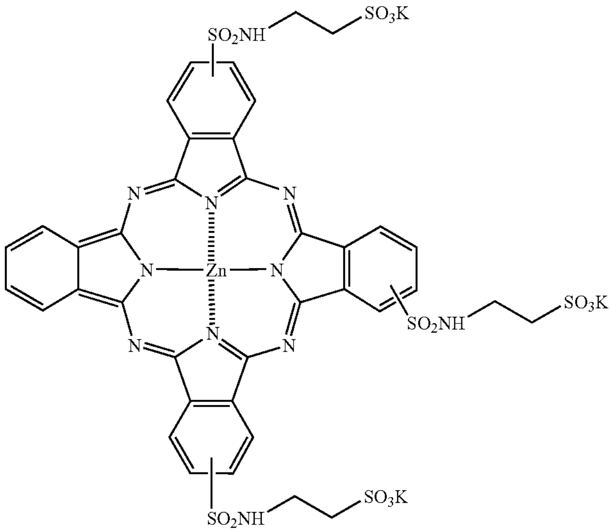
In the following Tables, specific examples of each pair of $(X_1, X_2)$, $(Y_{11}, Y_{12})$, $(Y_{13}, Y_{14})$, $(Y_{15}, Y_{16})$ and $(Y_{17}, Y_{18})$ are independently in an irregular order.
TABLE 1
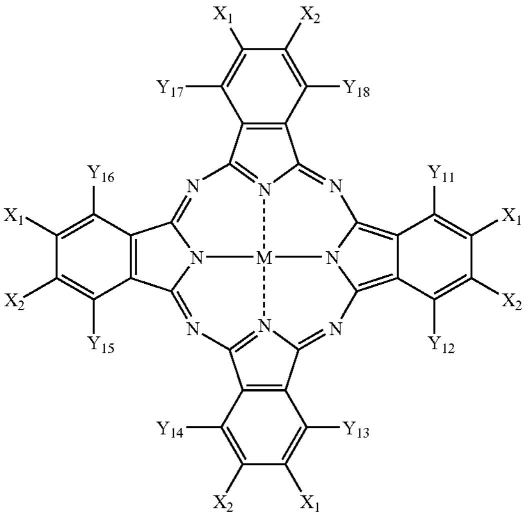
| No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 101 | Cu | $—SO_2—NH—CH_2—CH_3—SO_3Li$ | —H | —H, —H | —H, —H | —H, —H | —H, —H |
| 102 | Cu | $—SO_2—NH—CH_2—CH(OH)—CO—NH—CH_2CH_2—SO_3Na.$ | —H | —Cl, —H | —Cl, —H | —Cl, —H | —Cl, —H |
| 103 | Cu | $—SO_2—NH—CH_2—CH_2—CH_2—SO_2NH—CH_2CH(OH)—SO_3Li$ | —H | —H, —H | —H, —H | —H, —H | —H, —H |
| 104 | Cu | 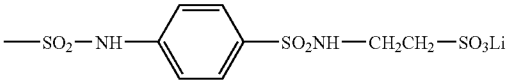 | —H | —H, —H | —H, —H | —H, —H | —H, —H |

TABLE 1-continued

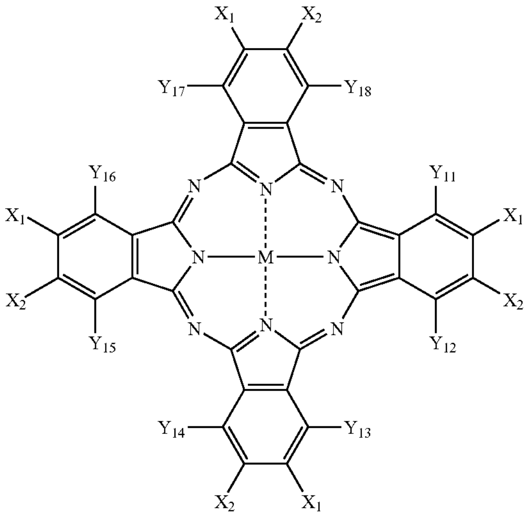

| No. | M | $X_1$ | $X_2$ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| 105 | Ni | $—SO_2—NH—CH_2—CH_2—CO—NH—CH(CH_2—COONa)—COONa$ | —H | —Cl, —H | —Cl, —H | —Cl, —H | —Cl, —H |
| 106 | Cu | $—SO_2—NH—CH_2—CH_2—SO_2—NH—CH_2—COONa$ | —CN | —H, —H | —H, —H | —H, —H | —H, —H |
| 107 | Cu | $—SO_2—CH_2—CH_2—CH_2—SO_2—NH—CH(CH_2—OH)—COOLi$ | —H | —H, —H | —H, —H | —H, —H | —H, —H |
| 108 | Cu | $—SO_2—CH_2—CH_2—CH_2—SO_3Li$ | —H | —H, —H | —H, —H | —H, —H | —H, —H |
| 109 | Cu | $—SO_2—CH_2—CH_2—CH_2—SO_2K$ | —H | —H, —H | —H, —H | —H, —H | —H, —H |
| 110 | Cu | $—SO_2—(CH_2)_5—CO_2K$ | —H | —H, —H | —H, —H | —H, —H | —H, —H |

TABLE 2

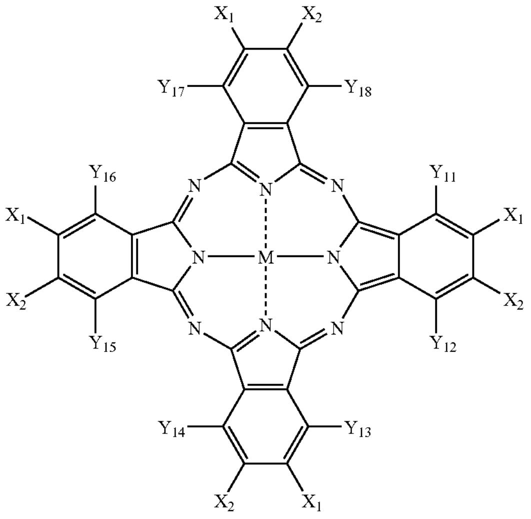

| No. | M | $X_1$ | $X_2$ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| 111 | Cu | $—SO_2—NH—CH_2—CH_2—CH_2—SO_2—NH—CH_2CH(OH)—CH_2—SO_3Li$ | —H | —H, —H | —H, —H | —H, —H | —H, —H |

TABLE 2-continued
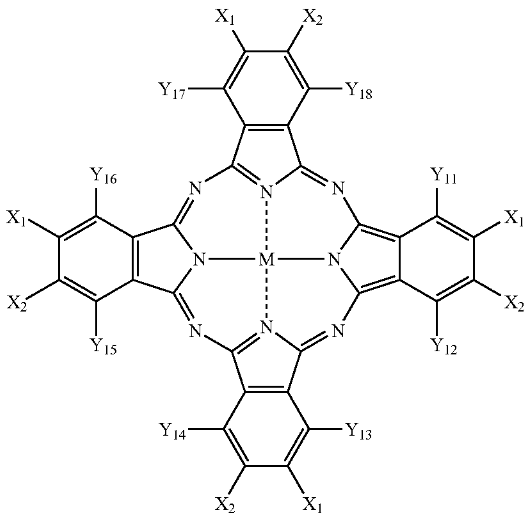
| No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 112 | Cu | $—SO_2—NH—CH_2—CH_2—CH_2—SO_2NH—CH_2—CH(OH)—CH_3$ | $—SO_3Li$ | —H, —H | —H, —H | —H, —H | —H, —H |
| 113 | Cu | $—SO_2—CH_2—CH(OH)—CH_2SO_3K$ | —H | —H, —H | —H, —H | —H, —H | —H, —H |
| 114 | Cu | $—SO_2—CH_2—CH(OH)—CH_3$ | $—SO_3Li$ | —H, —H | —H, —H | —H, —H | —H, —H |
| 115 | Cu | 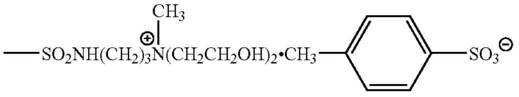 | —H | —H, —H | —H, —H | —H, —H | —H, —H |
| 116 | Cu | $—CO—NH—CH_2—CH(OH)—CH_2SO_3K$ | —H | —H, —H | —H, —H | —H, —H | —H, —H |
| 117 | Cu | $—CO—NH—CH(COOLi)—CH_2CH_2SO_3Li$ | —H | —H, —H | —H, —H | —H, —H | —H, —H |

TABLE 3
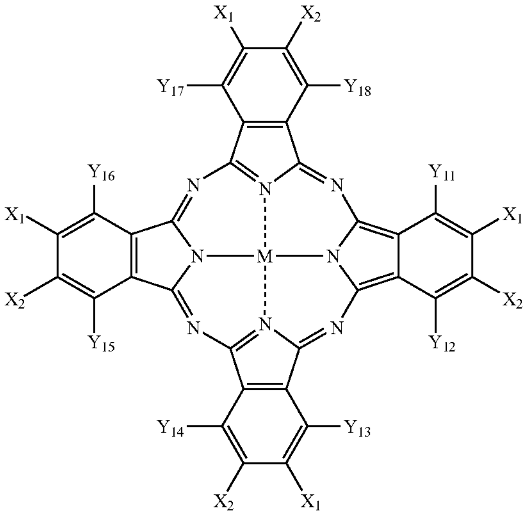
| No. | M | $X_1$ | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|---|---|
| 118 | Cu | $—SO_2CH_2CH_2CH(CH_3)(SO_3Li)$ | —H | —H, —H | —H, —H | —H, —H | —H, —H |
| 119 | Cu | $—SO_2—CH_2—CH(OH)—CH_2—SO_3Na$ | —H | —H, —H | —H, —H | —H, —H | —H, —H |
| 120 | Cu | $—SO_2—CH_2—CH_2—CH(CH_3)—COOLi$ | —H | —H, —H | —H, —H | —H, —H | —H, —H |
| 121 | Cu | $—SO_2(CH_2)_3SO_2NHCH_2—CH(OH)—CH_2—SO_3Li$ | —H | —H, —H | —H, —H | —H, —H | —H, —H |
| 122 | Cu | $—CO_2CH_2CH_2CH_2SO_2—NH—CH_2—CH(OH)—CH_2—SO_3Li$ | —H | —H, —H | —H, —H | —H, —H | —H, —H |
| 123 | Cu | $—SO_2NH—C_2H_{17}(t)$ | —H | —H, —H | —H, —H | —H, —H | —H, —H |
| 124 | Cu | $—SO_2—NH—CH_2—CH(CH_2CH_3)—CH_2CHCH_2—CH_3$ | —H | —H, —H | —H, —H | —H, —H | —H, —H |

TABLE 4
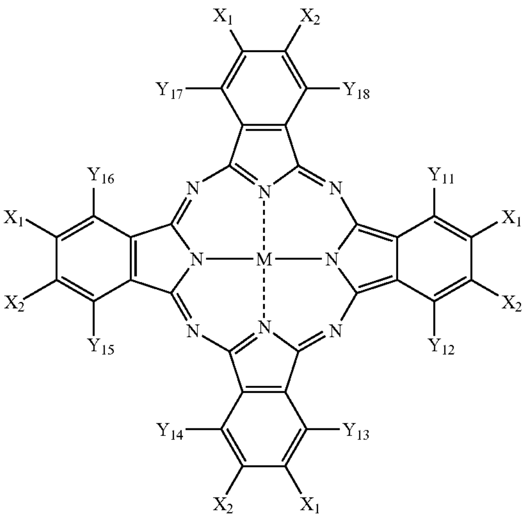
| No. | M | X1 | X2 | Y11, Y12 | Y13, Y14 | Y15, Y16 | Y17, Y18 |
|---|---|---|---|---|---|---|---|
| 125 | Cu | $—SO_2CH_2CH_2CH_2SO_3—NH—CH_2—CH(CH_3)—CH_3$ | —H | —H, —H | —H, —H | —H, —H | —H, —H |
| 126 | Cu | $—SO_2—CH_2—CH_2—CH_2—CO_2—CH(CH_3)—CH_2—O—CH_3$ | —H | —H, —H | —H, —H | —H, —H | —H, —H |
| 127 | Cu | $—SO_2CH_2CH_2CH_2SO_2NHCH_2CH_2CH_2O—CH(CH_3)(CH_3)$ | —H | —H, —H | —H, —H | —H, —H | —H, —H |
| 128 | Zn | $—SO_2—CH_2—CH(O—CH_3)—CH_2—O—CH_2$ | —CN | —H, —H | —H, —H | —H, —H | —H, —H |
| 129 | Cu | $—CO—NH—CH_2—CH(CH_2CH_3)—CH_2—CH_2—CH_2CH_3$ | —H | —Cl, —H | —Cl, —H | —Cl, —H | —Cl, —H |
| 130 | Cu | $—CO_2—CH(CH_3)—CH_2—O—C_4H_9(t)$ | —H | —H, —H | —H, —H | —H, —H | —H, —H |
| 131 | Cu | 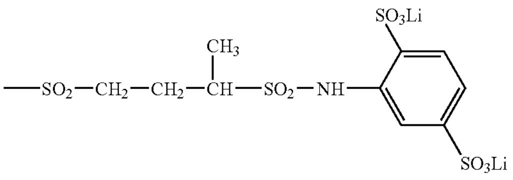 | —H | —H, —H | —H, —H | —H, —H | —H, —H |

TABLE 5
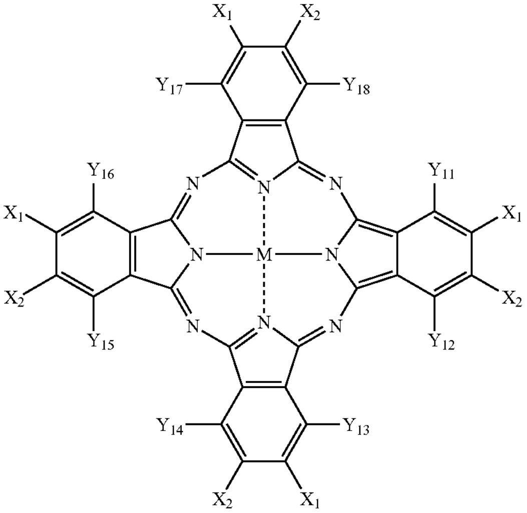
| No. | M | $X_1$ | $X_2$ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| 132 | Cu | 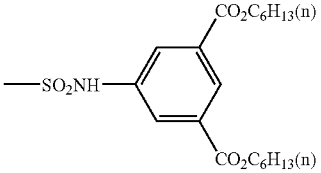 | —H | —H, —H | —H, —H | —H, —H | —H, —H |
| 133 | Cu | 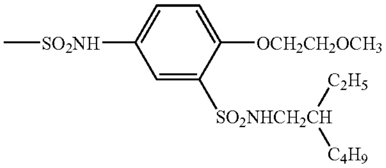 | —H | —H, —H | —H, —H | —H, —H | —H, —H |
| 134 | Cu | 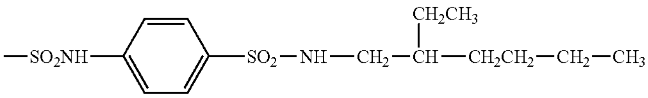 | —H | —H, —H | —H, —H | —H, —H | —H, —H |
| 135 | Cu | 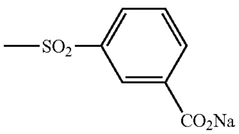 | —H | —H, —H | —H, —H | —H, —H | —H, —H |
| 136 | Cu | 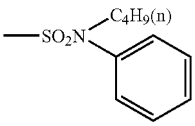 | —H | —H, —H | —H, —H | —H, —H | —H, —H |

TABLE 6
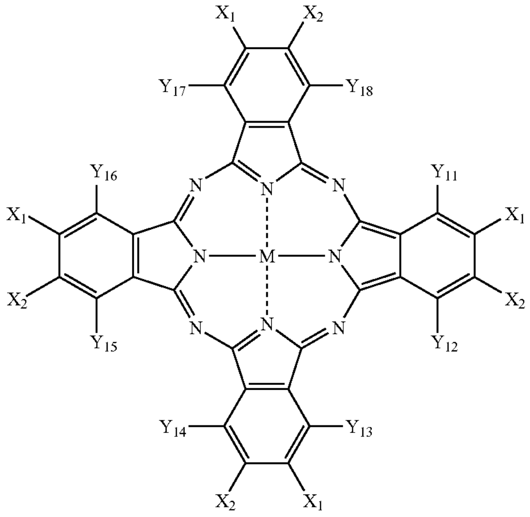
| No. | M | $X_1$ | $X_2$ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| 137 | Cu | 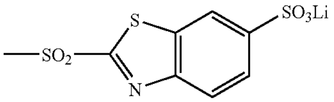 | —H | —H, —H | —H, —H | —H, —H | —H, —H |
| 138 | Cu | 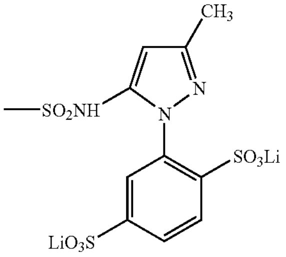 | —H | —H, —H | —H, —H | —H, —H | —H, —H |
| 139 | Cu | 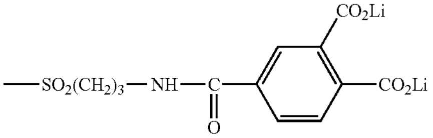 | —Cl | —H, —H | —H, —H | —H, —H | —H, —H |
| 140 | Cu | 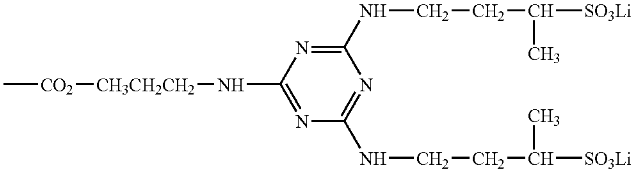 | —H | —H, —H | —H, —H | —H, —H | —H, —H |

TABLE 7

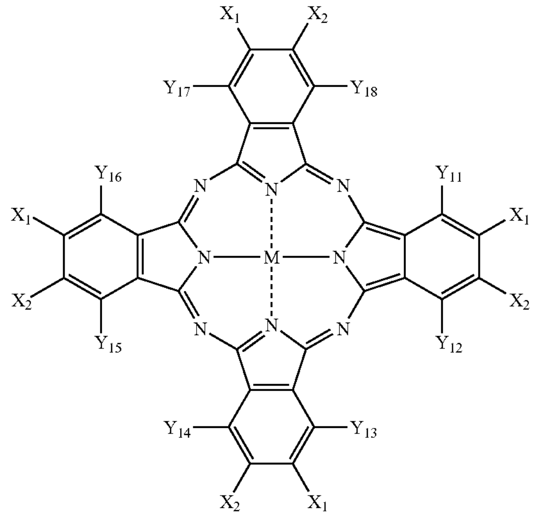

| No. | M | $X_1$ | $X_2$ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| 141 | Cu | $—SO_2NH—CH(COONa)—CH_2—CO—N(CH_2CH_2OH)_2$ | —H | —H, —H | —H, —H | —H, —H | —H, —H |
| 142 | Cu | 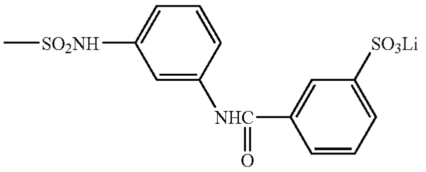 | —H | —H, —H | —H, —H | —H, —H | —H, —H |
| 143 | Cu | $—CO—NH—CH_2—CH(OH)—CO—NH—CH(COOK)—CH_2CH_2—SO_3K$ | —H | —H, —H | —H, —H | —H, —H | —H, —H |
| 144 | Cu | 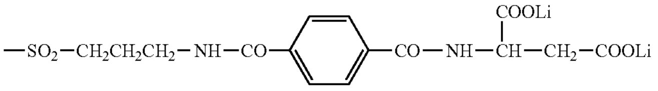 | —H | —H, —H | —H, —H | —H, —H | —H, —H |
| 145 | Cu | $—SO_2CH_2CH_2OCH_2CH_2OCH_2CH_2SO_3Li$ | —H | —H, —H | —H, —H | —H, —H | —H, —H |

In the following Tables, each introduction site of substituents ($R_1$) and ($R_2$) is in an irregular order within the β-position substitution type.

TABLE 8

| M-Po$(R_1)_m(R_2)_n$ | | | |
|---|---|---|---|
| No. | M | $R_1$ | m |
| 146 | Cu | $—SO_2—NH—CH_2—CH(CH_3)—SO_3Li$ | 3 |
| 147 | Cu | $—SO_2—NH—CH_2—CH_2SO_3Li$ | 3 |
| 148 | Cu | $—SO_2—NH—CH_2—CH(CH_3)—SO_3Li$ | 3 |

TABLE 8-continued

| M-Po(R1)m(R2)n | | | |
|---|---|---|---|
| 149 | Cu | $-SO_2-NH-CH_2-CH(CH_3)-SO_3Li$ | 2 |
| 150 | Cu | $-SO_2-NH-CH_2-CH_2-SO_2-NH-CH_2CH_2-COONa$ | 3 |
| 151 | Cu | 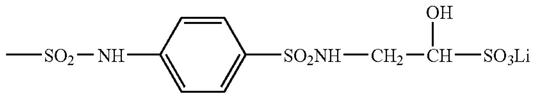 | 3 |
| 152 | Cu | $-SO_2-CH_2-CH_2-CH(CH_3)-SO_3Li$ | 2.5 |
| 153 | Cu | $-SO_2-CH_2-CH_2-CH(CH_3)-SO_3Na$ | 2 |
| 154 | Cu | $-SO_2-CH_2-CH_2-CH_2-SO_2Li$ | 3 |
| 155 | Cu | $-SO_2-CH_2-CH_2-CH_2-COOK$ | 2 |
| 156 | Cu | $-SO_2-CH_2-CH_2-CH_2-SO_2Li$ | 3 |
| 157 | Cu | $-SO_2-CH_2-CH_2-O-CH_2-CH_2-SO_2Li$ | 2 |

| No. | $R_2$ | n |
|---|---|---|
| 146 | $-SO_2-NH-CH_2-CH(OH)-CH_3$ | 1 |
| 147 | $-SO_2-NH-CH_2-CH_2-CH_2-SO_2-NH-CH_2-CH(OH)-CH_3$ | 1 |
| 148 | $-SO_2NH-CH_2-CH_2-CH_2-SO_2-NH-CH_2-CH_2-O-CH_2-CH_2-OH$ | 1 |
| 149 | $-SO_2-NH-CH_2-CH_2-CH_2-CO-N(CH_2-CH_2-OH)_2$ | 2 |
| 150 | $-SO_2NH-CH(CH_3)-CH_2OH$ | 1 |
| 151 | $-SO_2NH-CH_2-CH_2-O-CH_2-CH_2-OH$ | 1 |
| 152 | $-SO_2-CH_2-CH_2-O-CH_2-CH_2-OH$ | 1.5 |
| 153 | $-SO_2-CH_2-CH_2-CH_2-CO-N(CH_2-CH_2-OH)_2$ | 2 |
| 154 | $-SO_2-CH_2-CH_2-CH_2-SO_2-NH-CH_2-CH(OH)-CH_3$ | 1 |
| 155 | $-SO_2-CH_2-CH_2-CH_2-SO_2-NH-CH_2-CH(OH)-CH_2-COOK$ | 2 |
| 156 | $-SO_2-CH_2-CH(OH)-CH_2-SO_2Li$ | 1 |
| 157 | $-SO_2-CH_2-CH_2-CH_2-CO_2-CH_2-CH_2-CH(OH)-CH_2-COOK$ | 2 |

TABLE 9

| M-Pc(R1)m(R2)n | | | |
|---|---|---|---|
| No. | M | $R_1$ | m |
| 158 | Cu | $-SO_2-CH_2-CH(OH)-CH_2-SO_3Li$ | 3 |

TABLE 9-continued

| M-Pc($R_1$)$_m$($R_2$)$_n$ | | | |
|---|---|---|---|
| 159 | Cu | —$SO_2NHCH_2CH_2$—$SO_3Li$ | 3 |
| 160 | Cu | —$SO_2$—$CH_2$—$CH_2$—O—$CH_2$—$CH_2$—O—$CH_2$—$CH_2$—$SO_2Na$ | 3 |
| 161 | Cu | —$SO_2CH_2CH_2CH_2SO_3Li$ | 3 |
| 162 | Cu | —$SO_2CH_2CH_2CH_2SO_3Li$ | 2 |
| 163 | Cu | —$SO_2CH_2CH_2CH_2SO_2K$ | 3 |
| 164 | Cu | —$SO_2CH_2CH_2CH_2SO_3Li$ | 2 |
| 165 | Cu | —CO—NH—$CH_2$—$CH_2$—$SO_2K$ | 3 |
| 166 | Cu | —CO—NH—$CH_2$—$CH_2$—$SO_2$—NH—$CH_2$—COONa | 3 |
| 167 | Cu | 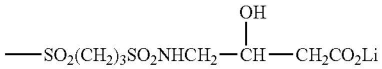 | 2.5 |
| 168 | Cu | 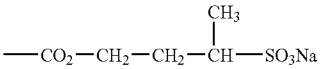 | 2 |
| 169 | Cu | —$CO_2$—$CH_2$—$CH_2$—$CH_2$—$SO_2Li$ | 3 |
| 170 | Cu | —$CO_2$—$CH_2$—$CH_2$—$CH_2COOK$ | 2 |

| No. | $R_2$ | n |
|---|---|---|
| 158 | 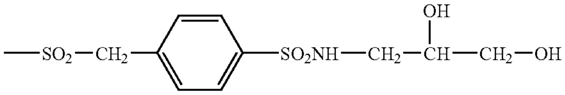 | 1 |
| 159 | 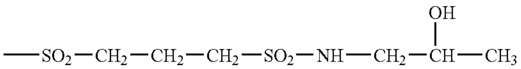 | 1 |
| 160 | 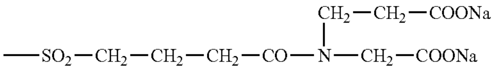 | 1 |
| 161 | 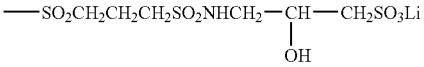 | 1 |
| 162 | —$SO_2CH_2CH_2OCH_2CH_2OCH_2CH_2OH$ | 2 |
| 163 | 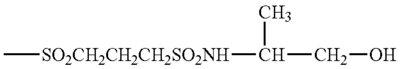 | 1 |
| 164 | —$SO_2CH_2CH_2CH_2SO_2N(CH_2CH_2CH)_2$ | 2 |
| 165 | —CO—NH—$CH_2$—$CH_2$—O—$CH_2$—$CH_2$—OH | 1 |
| 166 | 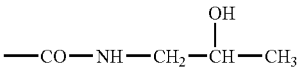 | 1 |
| 167 | —CO—NH—$CH_2$—$CH_2$—$CH_2$—CO—N—($CH_2$—$CH_2$—OH)$_2$ | 1.5 |
| 168 | —CO—$CH_2$—$CH_2$—$CH_2$—CO—N—($CH_2$—$CH_2$—OH)$_2$ | 2 |
| 169 | 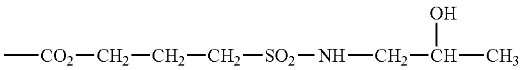 | 1 |
| 170 | 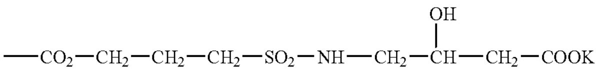 | 2 |

TABLE 10

| M-Po(R)$_m$($R_2$)$_n$ | | | |
|---|---|---|---|
| No. | M | $R_1$ | m |
| 171 | Cu | —$CO_2$—$CH_2$—CH—O—$CH_2$—$CH_2$—O—$CH_2$—$CH_2$—$SO_2Na$ | 3 |
| 172 | Cu | —$SO_2Ch_2CH_2OCH_2CH_2O$—$CH_2CH_2SO_2K$ | 2 |

TABLE 10-continued

| | | $M\text{-}Po(R)_m(R_2)_n$ | |
|---|---|---|---|
| 173 | Cu | $-SO_2(CH_2)_3SO_2NHCH_2(OH)CH_2OH$ | 2 |
| 174 | Cu | $-SO_2(CH_2)_3SO_2NHCH_2-CH(OH)-CH_2SO_3K$ | 3 |
| 175 | Cu | $-SO_2(CH_2(_2SO_2NH(CH_2)_3N(CH_2CH_2OH)_2$ | 2 |
| 176 | Cu | $-SO_2-CH_2-CH_2-CH_2-SO_2-NH-CH_2-CH(OH)-CH_3$ | 3 |
| 177 | Cu | $-SO_2-CH_2-CH_2-O-CH_2-CH_2-O-CH_3$ | 2 |
| 178 | Cu | $-SO_2-CH_2-CH_2-O-CH_2-CH_2-O-CH_2-CH_2-OH$ | 3 |
| 179 | Cu | $-SO_2-CH_2-CH(CH_2CH_3)-CH_2CH_2-CH_2CH_3$ | 2 |
| 180 | Cu | $-SO_2-CH_2-CH_2-CH_2-SO_2-NH-CH_2-CH(O-CH_3)-CH_3$ | 3 |
| 181 | Cu | $-SO_2-CH_2-CH_2-CH_2-CO_2-NH-CH(CH_3)-CH_2-CH_3$ | 3 |
| 182 | Cu | $-SO_2-CH_2-CH_2-CH_2-SO_2NH-CH_2-CH(OH)-CH_3$ | 2.5 |

| No. | $R_2$ | n |
|---|---|---|
| 171 | 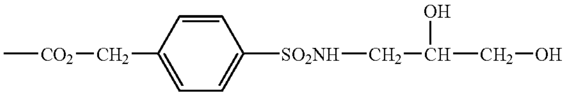 | 1 |
| 172 | $-CO_2-CH_2-CH_2-CH_2-CO_2-CH_2-CH_2-CH(OH)-CH_2-COOK$ | 2 |
| 173 | $-CO_2-CH_2-CH(OH)-CH_2-SO_3Li$ | 2 |
| 174 | $-CO_2-CH_2-CH_2-CH_2-SO_2-NH-CH_2-CH(OH)-CH_3$ | 1 |
| 175 | $-CO_2-CH_2-CH_2-CH_2-CO-N(CH_2-CH_2-COOLi)-CH_2-COOLi$ | 2 |
| 176 | $-SO_2-CH_2-CH_2-CH_2-SO_2-NH-CH_2-CH(CH_2CH_3)-CH_2CH_2-CH_2CH_3$ | 1 |
| 177 | $-SO_2-CH_2-CH_2-CH_2-SO_2-NH-CH_2-CH(OH)-CH_3$ | 1 |
| 178 | $-SO_2-CH_2-CH_2-CH_2-CO_2-CH_2-CH(CH_2CH_3)-CH_2CH_2-CH_2CH_3$ | 1 |
| 179 | $-SO_2-CH_2-CH_2-CH_2-SO_2-NH-CH_2-CH(O-CH_3)-CH_3$ | 2 |

TABLE 10-continued

| M-Po(R)$_m$(R$_2$)$_n$ | | |
|---|---|---|
| 180 | —$SO_2$NH—$CH_2$—$CH_2$—CH—$SO_2$NH—$CH_2$—$CH_2$—O—$CH_2$—$CH_2$—OH | 1 |
| 181 | —$SO_2$—$CH_2$—$CH_2$—$CH_2$—$SO_2$—NH—CH—($CH_3$)$_2$ | 1 |
| 182 | —$SO_2$—$CH_2$—$CH_2$—$CH_2$—$CO_2$—NH—CH($CH_3$)—$CH_2$—$CH_3$ | 1.5 |

TABLE 11

| M-Pc(R$_1$)$_m$(R$_2$)$_n$ | | | | | |
|---|---|---|---|---|---|
| No. | M | R$_1$ | m | R$_2$ | n |
| 183 | Cu | —$SO_2$—$CH_2$—$CH_2$—$CH_2$—$CO_2$—NH—CH($CH_3$)—$CH_2$—$CH_3$ | 2 | —$SO_2$—$CH_2$—$CH_2$—$CH_2$—$SO_2$—NH—($CH_2$)$_3$—$CH_2$—O—$CH_2CH_2$—OH | 2 |
| 184 | Cu | —$SO_2$—$CH_2$—$CH_2$—$CH_2$—$SO_2$—NH—$CH_2$—CH(OH)—$CH_3$ | 3 | —$SO_2$—$CH_2$—$CH_2$—O—$CH_2$—$CH_2$—O—$CH_2$ | 1 |
| 185 | Cu | —$SO_2$—$CH_2$—$CH_2$—$CH_2$—$SO_2$—NH—$CH_2$—CH(OH)—$CH_3$ | 3 | —$SO_2$—$CH_2$—$CH_2$—O—$CH_2$—$CH_2$—O—$CH_2$—$CH_2$—O—$CH_3$ | 1 |
| 186 | Cu | —$CO_2$—$CH_2$—$CH_2$—$CH_2$—$CO_2$—NH—CH($CH_3$)—$CH_2$—$CH_3$ | 3 | —$SO_2$—$CH_2$—$CH_2$—O—$CH_2$—$CH_2$—O—$CH_2$—$CH_2$—OH | 1 |
| 187 | Cu | —$SO_2$—$CH_2$—$CH_2$—$CH_2$—$SO_2$—NH—CH—($CH_3$)$_2$ | 3 | —$CO_2$—$CH_2$—CH($CH_2CH_3$)—$CH_2$—$CH_2$—$CH_2CH_3$ | 1 |
| 188 | Cu | —$CO_2$—$CH_2$—$CH_2$—$CH_2$—$CO_2$—NH—CH($CH_3$)—$CH_2$—$CH_3$ | 3 | —$CO_2$—$CH_2$—$CH_2$—O—$CH_2$—$CH_2$—O—$CH_2$ | 1 |
| 189 | Cu | —CO—NH—$CH_2$—$CH_2$—$SO_2$—NH—CH—($CH_3$)$_2$ | 3 | —$SO_2$—NH—$CH_2$—CH($CH_2CH_3$)—$CH_2$—$CH_2$—$CH_2$—$CH_3$ | 1 |
| 190 | Cu | —CO—NH—$CH_2$—CH($CH_2CH_3$)—$CH_2$—$CH_2$—$CH_2CH_3$ | 3 | —CO—NH—$CH_2$—$CH_2$—O—$CH_2$—$CH_2$—O—$CH_2$ | 1 |

The structural formula of the phthalocyanine compound represented by M-Pc$(X_{p1})_m(X_{P2})_n$ in Tables 8 to 11 is shown below:

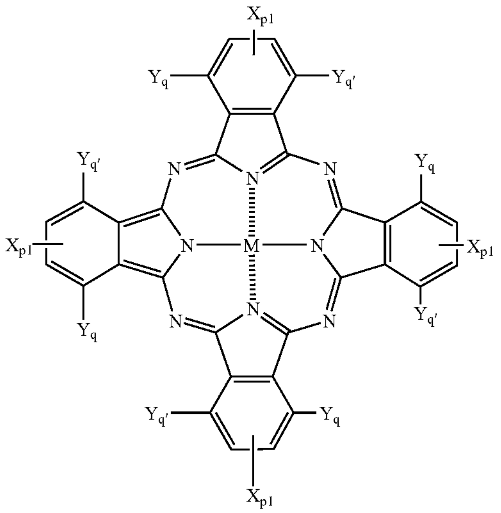

(wherein each X is independently $X_{p1}$ or $X_{p2}$).

The phthalocyanine dye represented by formula (I) can be synthesized according to the patent publications described above. Furthermore, the phthalocyanine dye represented by formula (II) can be synthesized by the methods described in JP-A-2001-226275, JP-A-2001-96610, JP-A-2001-47013 and JP-A-2001-193638 in addition to the above-described synthesis method. The starting material, dye intermediate and synthesis route are not limited to those described in these patent publications.

The inkjet recording ink of the present invention contains the phthalocyanine dye in an amount of preferably from 0.2 to 20 wt %, more preferably from 0.5 to 15 wt %.

In the ink of the present invention, other dyes may be used in combination with the above-described phthalocyanine dye so as to adjust the color tone for obtaining a full color image. Examples of the dye which can be used in combination include the followings.

Examples of the yellow dye include aryl- or heteryl-azo dyes having a phenol, a naphthol, an aniline, a pyrazolone, a pyridone or an open chain-type active methylene compound as the coupling component; azomethine dyes having an open chain-type active methylene compound as the coupling component; methine dyes such as benzylidene dye and monomethine oxonol dye; and quinone-base dyes such as naphthoquinone dye and anthraquinone dye. Other examples of the dye species include quinophthalone dye, nitro-nitroso dye, acridine dye and acridinone dye. These dyes may be a dye which provides a yellow color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

Examples of the magenta dye include aryl- or heteryl-azo dyes having a phenol, a naphthol or an aniline as the coupling component; azomethine dyes having a pyrazolone or a pyrazolotriazole as the coupling component; methine dyes such as arylidene dye, styryl dye, merocyanine dye and oxonol dye; carbonium dyes such as diphenylmethane dye, triphenylmethane dye and xanthene dye; quinone-base dyes such as naphthoquinone, anthraquinone and anthrapyridone; and condensed polycyclic dyes such as dioxazine dye. These dyes may be a dye which provides a magenta color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

Examples of the cyan dye include azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl- or heteryl-azo dyes having a phenol, a naphthol or an aniline as the coupling component; and indigo•thioindigo dyes. These dyes may be a dye which provides a cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

A black dye such as polyazo dye can also be used.

Also, a water-soluble dye such as direct dye, acid dye, food color, basic dye and reactive dye may be used in combination. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. Direct Yellow 8, 9, 11, 12, 27, 28, 29, 33, 35, 39, 41, 44, 50, 53, 58, 59, 68, 86, 67, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

Furthermore, a pigment can also be used in combination.

As the pigment for use in the ink of the present invention, commercially available pigments and known pigments described in various publications can be used. The publication includes *Color Index*, compiled by The Society of Dyers and Colourists, *Kaitei Shin Han Ganryo Binran* (*Revised New Handbook of Pigments*), compiled by Nippon Ganryo Gijttsu Kyokai (1989), *Saishin Ganryo Oyo Gilutsu* (*Newest Pigment Application Technology*), CMC Shuppan (1986), *Insatsu Ink Gijutsu* (*Printing Ink Technique*), CMC Shuppan (1984), and W. Herbst and K. Hunger, *Industrial Organic Pigments*, VCH Verlagsgesellschaft (1993). Specific examples of the organic pigment include azo pigments (e.g., azo lake pigment, insoluble azo pigment, condensed azo pigment, chelate azo pigment), polycyclic pigments (e.g., phthalocyanine-base pigment, anthraquinone-base pigment, perylene- or perynone-base pigment, indigo-base pigment, quinacridone-base pigment, dioxazine-base pigment, isoindolinone-base pigment, quinophthalone-base pigment, diketopyrrolopyrrole-base pigment), dyeing lake pigments (lake pigments of acidic or basic dye) and azine pigments. Specific examples of the inorganic pigment include yellow pigments such as C.I. Pigment Yellow 34, 37, 42 and 53, red-type pigments such as C.I. Pigment Red 101 and 108, blue-type pigments such as C.I. Pigment Blue 27, 29 and 17:1, black-type pigments such as C.I. Pigment Black 7 and magnetite, and white-type pigments such as C.I. Pigment White 4, 6, 18 and 21.

The pigments having a preferred color tone for the formation of an image include the followings. As the blue to cyan pigment, phthalocyanine pigments, anthraquinone-type indanthrone pigments (for example, C.I. Pigment Blue 60) and dyeing lake pigment-type triarylcarbonium pigments are preferred, and phthalocyanine pigments are most preferred (preferred examples thereof include copper phthalocyanine such as C.I. Pigment Blue 15:1, 15:2, 15:3, 15:4 and 15:6, monochloro to low chlorinated copper phthalocyanine, aluminum phthalocyanine such as pigments described in European Patent 860475, nonmetallic phthalocyanine such as C.I. Pigment Blue 16, and phthalocyanine with the center metal being Zn, Ni or Ti, and among these, C.I. Pigment Blue 15:3 and 15:4 and aluminum phthalocyanine are more preferred).

As the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-base pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-base C.I. Pigment Red 81:1 and C.I. Pigment Violet 1, 2, 3, 27 and 39), dioxazine-base pigments (for example, C.I. Pigment Violet 23 and 37), diketopyrrolopyrrole-base pigments (for example, C.I. Pigment Red 254), perylene pigments (for example, C.I. Pigment Violet 29), anthraquinone-base pigments (for example, C.I. Pigment Violet 5:1, 31 and 33) and thioindigo-base pigments (for example, C.I. Pigment Red 38 and 88) are preferred.

As the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-type C.I. Pigment Yellow 93, 94, 95, 128 and 155, and benzimidazolone-type C.I. Pigment Yellow 120, 151, 154, 156 and 180, and among these, those not using a benzidine-base compound as a raw material are more preferred), isoindoline isoindolinone-base pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24) are preferred.

As the black pigment, inorganic pigments (preferred examples thereof include carbon black and magnetite) and aniline black are preferred. Other than these, an orange pigment (for example, C.I. Pigment Orange 13 and 16) and a green pigment (for example, C.I. Pigment Green 7) may be used.

Furthermore, a pigment can also be used in combination.

As the pigment for use in the ink of the present invention, commercially available pigments and known pigments described in various publications can be used. The publication includes *Color Index*, compiled by The Society of Dyers and Colourists, *Kaitei Shin Han Ganryo Binran* (*Revised New Handbook of Pigments*), compiled by Nippon Ganryo Gijutsu Kyokai (1989), *Saishin Ganryo Oyo Gijutsu* (*Newest Pigment Application Technology*), CMC Shuppan (1986), *Insatsu Ink Gijutsu* (*Printing Ink Technique*). CMC Shuppan (1984), and W. Herbst and K. Hunger, *Industrial Organic Pigments*, VCH Verlagsgesellschaft (1993), Specific examples of the organic pigment include azo pigments (e.g., azo lake pigment, insoluble azo pigment, condensed azo pigment, chelate azo pigment), polycyclic pigments (e.g., phthalocyanine-base pigment, anthraquinone-base pigment, perylene- or perynone-base pigment, indigo-base pigment, quinacridone-base pigment, dioxazine-base pigment, isoindolinone-base pigment, quinophthalone-base pigment, diketopyrrolopyrrole-base pigment), dyeing lake pigments (lake pigments of acidic or basic dye) and azine pigments, Specific examples of the inorganic pigment include yellow pigments such as C.I. Pigment Yellow 34, 37, 42 and 53, red-type pigments such as C.I. Pigment Red 101 and 108, blue-type pigments such as C.I. Pigment Blue 27, 29 and 17:1, black-type pigments such as C.I. Pigment Black 7 and magnetite, and white-type pigments such as C.I. Pigment White 4, 6, 18 and 21.

The pigments having a preferred color tone for the formation of an image include the followings. As the blue to cyan pigment, phthalocyanine pigments, anthraquinone-type indanthrone pigments (for example, C.I. Pigment Blue 60) and dyeing lake pigment-type triarylcarbonium pigments are preferred, and phthalocyanine pigments are most preferred (preferred examples thereof include copper phthalocyanine such as C.I. Pigment Blue 15:1, 15:2, 15:3, 15:4 and 15;6, monochloro to low chlorinated copper phthalocyanine, aluminum phthalocyanine such as pigments described in European Patent 860475, nonmetallic phthalocyanine such as C.I. Pigment Slue 16, and phthalocyanine with the center metal being Zn, Ni or Ti, and among these, C.I. Pigment Blue 15:3 and 15:4 and aluminum phthalocyanine are more preferred).

As the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-base pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-base C.I. Pigment Red 81:1 and C.I. Pigment Violet 1, 2, 3, 27 and 39), dioxazine-base pigments (for example, C.I. Pigment Violet 23 and 37), diketopyrrolopyrrole-base pigments (for example, C.I. Pigment Red 254), perylene pigments (for example, C.I. Pigment Violet 29), anthraquinone-base pigments (for example, C.I. Pigment Violet 5:1, 31 and 33) and thioindigo-base pigments (for example, C.I. Pigment Red 38 and 88) are preferred.

As the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-type C.I. Pigment Yellow 93, 94, 95, 128 and 155, and benzimidazolone-type C.I. Pigment Yellow 120, 151, 154, 156 and 180, and among these, those not using a benzidine-base compound as a raw material are more preferred), isoindoline•isoindolinone-base pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24) are preferred.

As the black pigment, inorganic pigments (preferred examples thereof include carbon black and magnetite) and aniline black are preferred.

Other than these, an orange pigment (for example, C.I. Pigment orange 13 and 16) and a green pigment (for example, C.I. Pigment Green 7) may be used.

The pigment which can be used in the ink of the present invention may be the above-described pigment as it is or the pigment after the surface treatment. For the surface treatment, a method of coating the surface with resin or wax, a method of attaching a surfactant, and a method of binding a reactive substance (for example, a radical generated from a silane coupling agent, an epoxy compound, polyisocyanate or a diazonium salt) to the pigment surface may be used and these are described in the following publications and patents:

(1) *Kinzoku Sekken no Seishitau to Oyo* (*Properties and Applications of Metal Soap*), Saiwai Shobo;

(2) *Insatsu Ink Insatsu* (*Printing Ink Printing*), CMC Shuppan (1984);

(3) *Saishin Ganryo Oyo Gijutsu* (*Newest Pigment Application Technology*), CMC Shuppan (1986);

(4) U.S. Pat. Nos. 5,554,739 and 5,571,311; and (5) JP-A-9-151342, JP-A-10-140065, JP-A-10-292143 and JP-A-11-166145.

Particularly, self-dispersible pigments prepared by using a diazonium salt to act on carbon black described in U.S. patents of (4) and capsulated pigments prepared by the method described in Japanese Patent Publications of (5) are effective because dispersion stability can be obtained without using an excess dispersant in the ink.

In the ink of the present invention, the pigment may be dispersed by further using a dispersant. Various known dispersants can be used according to the pigment used, for example, a surfactant-type low molecular dispersant or a polymer-type dispersant can be used. Examples of the dispersant include those described in JP-A-3-69949 and European Patent 549486. In using the dispersant, a pigment derivative called synergist may also be added so as to accelerate the adsorption of dispersant to the pigment.

The particle size of the pigment which can be used in the present invention is, after the dispersion, preferably from 0.01 to 10 μm, more preferably from 0.05 to 1 μm.

As for the method of dispersing the pigment, known dispersion techniques used at the production of ink or toner can be used. Examples of the dispersing machine include vertical or horizontal agitator mill, attritor, colloid mill, ball mill, three-roll mill, pearl mill, super-mill, impeller, disperser, KD mill, dynatron and pressure kneader. These are described in detail in *Saishin Ganryo Oyo Gijutsu* (*Newest Pigment Application Technology*), CMC Shuppan (1986).

The surfactant which can be contained in the ink-jet recording ink of the present invention is described below.

In the present invention, a surfactant is incorporated into the inkjet recording ink to control the liquid properties of ink, whereby excellent effects can be provided, such as improvement of ejection stability of the ink, elevation of water resistance of the image and prevention of bleeding of the printed ink.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content is from 0.001 to 20 wt %, preferably from 0.005 to 10 wt %, more preferably from 0.01 to 5 wt %, based on the ink.

The inkjet recording ink of the present invention can be produced by dissolving or dispersing the above-described phthalocyanine dye and preferably a surfactant in an aqueous medium. The "aqueous medium" as used in the present invention means water or a mixture of water and a slight amount of water-miscible organic solvent, where additives such as wetting agent, stabilizer and antiseptic are added, if desired.

At the preparation of the ink solution of the present invention, in the case of a water-soluble ink, the dye is preferably first dissolved in water and thereafter, various solvents and additives are added, dissolved and mixed to provide a uniform ink solution.

For dissolving the dye and the like, various methods such as stirring, ultrasonic irradiation and shaking can be used. Among these, stirring is preferred. In performing the stirring, various methods known in the art can be used, such is flow stirring and stirring utilizing the shearing force by means of a reversal agitator or a dissolver. Also, a stirring method utilizing the shearing force with the bottom surface of a container, such as magnetic stirrer, can be advantageously used.

Examples of the water-miscible organic solvent which can be used in the present invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propyleae glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

In the case where the above-described phthalocyanine dye is an oil-soluble dye, the ink solution can be prepared by dissolving the oil-soluble dye in a high boiling point organic solvent and emulsification-dispersing it in an aqueous medium.

The high boiling point organic solvent for use in the present invention has a boiling point of 150° C. or more, preferably 170° C. or more.

Examples thereof include phthalic acid esters (e.g., dibutyl phthalate, dioctyl phthalate, dicyclohexyl phthalate, di-2-ethylhexyl phthalate, decyl phthalate, bis (2,4-di-tert-amylphenyl) isophthalate, bis(1,1-diethylpropyl) phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tertamylphenyl, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid), alkylphosphoric acids (e.g., di-(2-ethylhexyl) phosphoric acid and diphenylphospboric acid). The high boiling point organic solvent can be used in an amount of, in terms of the weight ratio to the oil-soluble dye, from 0.01 to 3 times, preferably from 0.01 to 1.0 times.

These high boiling point organic solvents may be used individually or as a mixture of several kinds [for example, tricresyl phosphate and dibutyl phthalate, trioctyl phosphate and di(2-ethylhexyl) sebacate, or dibutyl phthalate and poly (N-tert-butylacrylamide)].

Examples of the high boiling point organic solvent for use in the present invention, other than the above-described compounds, and the synthesis method of these high boiling point organic solvents are described, for example, in U.S. Pat. Nos. 2,322,027, 2,533,514, 2,772,263, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,141, 159,573 and 225, 240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-10241, JP-A-2-792, JP-A-2-4239, JP-A2-43541, JP-A-4-29237, JP-A-4-30165, JP-A-4-232946 and JP-A-4-346338.

The high boiling point organic solvent is used in a weight ratio of 0.01 to 3.0 times, preferably from 0.01 to 1.0 times, to the oil-soluble dye.

In the present invention, the oil-soluble dye and the high boiling point organic solvent each is used by emulsification-dispersing it in an aqueous medium. At the emulsification-dispersion, a low boiling point organic solvent may be used depending on the case from the viewpoint of emulsifiability. The low boiling point organic solvent is an organic solvent having a boiling point of about 30° C. to 150° C. at atmospheric pressure. Preferred examples thereof include esters (e.g., ethyl acetate, butyl acetate, ethyl propionate, P-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane), however, the present invention is not limited thereto.

In the emulsification dispersion, an oil phase obtained by dissolving the dye in a high boiling point organic solvent or depending on the case, in a mixed solvent of a high boiling point organic solvent and a low boiling point organic solvent is dispersed in an aqueous phase mainly comprising water to form fine oil droplets of the oil phase. At this time, in either one or both of the aqueous phase and the oil phase, additives described later, such as surfactant, wetting agent, dye stabilizer, emulsification stabilizer, antiseptic and fungicide, can be added, if desired.

In the general emulsification method, an oil phase is added to an aqueous phase, however, a so-called phase inversion emulsification method of adding dropwise an aqueous phase in an oil phase can also be preferably used. The above-described emulsification method can also be applied when the phthalocyanine dye for use in the present invention is water-soluble and the additive is oil-soluble.

In performing the emulsification dispersion, various surfactants can be used. Preferred examples thereof include anionic surfactants such as fatty acid salt, alkylaulfuric ester salt, alkylbenzenesulfonato, alkylnaphthalenesulfonate, dialkylsulfosuccinate, alkylphosphoric ester salt, naphthalenesulfonic acid formalin condensate and polyoxyethylene-alkylsulfuric ester salt, and nonionic surfactants such as polyoxyethylene alkyl ether, polyoxyethylene alkylallyl ether, polyoxyetbylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which is an acetylene-base polyoxyethylene oxide surfactant, is preferably used. In addition, amine oxide-type amphoteric surfactants such as N,N-dimethyl-N-alkylamine oxide are preferred. Furthermore, surfactants described in JP-A-59-157636 (pages (37) to (38)) and *Research Disclosure*, No. 308119 (1989) can be used.

For the purpose of stabilizing the dispersion immediately after the emulsification, a water-soluble polymer may also be added in combination with the surfactant. As the water-soluble polymer, polyvinyl alcohol, polyvinylpyrrolidone, polyethylene oxide, polyacrylic acids polyacrylamide, and copolymers thereof are preferably used. In addition, natural water-soluble polymers such as polysaccharides, casein and gelatin are also preferably used. Furthermore, for the stabilization of the dye dispersion, a polymer which does not substantially dissolve in an aqueous medium, such as polyvinyl, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers and acrylonitriles, can also be used in combination. This polymer preferably contains —$SO_3^-$ or —$COO^-$. In the case of using in combination this polymer which does not substantially dissolve in an aqueous medium, the polymer is preferably used in an amount of 20 wt % or less, more preferably 10 wt % or less, based on the high boiling point organic solvent.

In preparing an aqueous ink by dispersing an oil-soluble dye or a high boiling point organic solvent according to the emulsification dispersion, control of the particle size is important. In order to elevate the color purity or density of an image formed by the ink jetting, it is essential to reduce the average particle size. The average particle size is, in terms of the volume average particle size, preferably 1 W or less, more preferably from 5 to 100 nm.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417-418. For example, the ink solution is diluted with distilled water such that the particle concentration in the ink becomes from 0.1 to 1 wt %, then, the particle size can be easily measured by a commercially available volume average particle size measuring apparatus (for example, Microtrac UPA, manufactured by Nikkiso K.K.). The dynamic light scattering method utilizing the laser Doppler effect is particularly preferred because even a small particle size can be measured.

The volume average particle size is an average particle size weighted with the particle volume and is obtained by multiplying the diameter of individual particles in the gathering of particles with the volume of the particle and dividing the sum total of the obtained values by the total volume of particles. The volume average particle size is described in *Soichi Muroi, Kobunshi Latex no Yagaku* (*Chemistry of Polymer Latex*), page 119, Kobunshi Kanko Kai.

Also, it is revealed that the presence of coarse particles greatly affects the printing performance. More specifically, the coarse particle clogs the nozzle of head or even if the nozzle is not clogged, forms a soil to bring about failure or slippage in the ejection of ink and seriously affect the printing performance. In order to prevent these troubles, it is important that when an ink is prepared, the number of particles having a particle size of 5 μm or more and the number of particles having a particle size of 1 μm or more are reduced to 10 or less and 1,000 or less, respectively, in 1 μl of ink.

For removing these coarse particles, a known method such as centrifugal separation or microfiltration can be used. This separation step may be performed immediately after the emulsification dispersion or may be performed immediately before filling the ink in an ink cartridge after various additives such as wetting agent and surfactant are added to the emulsified dispersion.

A mechanically emulsifying apparatus is effective for reducing the average particle size and eliminating coarse particles.

As the emulsifying apparatus, known devices such as simple stirrer, impeller stirring system, in-line stirring system, mill system such as colloid mill, and ultrasonic system can be used, however, a high-pressure homogenizer is particularly preferred.

The mechanism of the high-pressure homogenizer is described in detail in U.S. Pat. No. 4,533,254 and JP-A-64-7264. Examples of the commercially available apparatus include Gaulin Homogenizer (manufactured by A.P.V Gaulin Inc.), Microfluidizer (manufactured by Mirrofluidex Inc.) and Altimizer (produced by Sugino Machine).

The recent high-pressure homogenizer with a mechanism of pulverizing particles in an ultrahigh pressure jet stream described in U.S. Pat. No. 5,720,551 is particularly effective for the emulsification dispersion of the present invention. Examples of the emulsifying apparatus using this ultrahigh pressure jet stream include DeBEE2000 (manufactured by BEE International Ltd.).

In performing the emulsification by a high-pressure emulsification dispersing apparatus, the pressure is 50 MPa or more, preferably 60 MPa or more, more preferably 180 MPa or more.

A method of using two or more emulsifying devices, for example, emulsification in a stirring emulsifier and then passing through a high-pressure homogenizer, is particularly preferred. Also, a method of once emulsification dispersing the dye solution by such an emulsifying apparatus and after adding additives such as wetting agent and surfactant, again passing the dispersion through a high-pressure homogenizer until filling the ink into a cartridge is preferred.

In the case of containing a low boiling point organic solvent in addition to a high boiling point organic solvent, the low boiling point solvent is preferably removed in view of stability of the emulsified product, safety and hygiene. For removing the low boiling point solvent, various known methods can be used according to the kind of solvent. Examples of the method include evaporation, vacuum evaporation and ultrafiltration. This removal of the low boiling point organic solvent is preferably performed as soon is possible immediately after the emulsification.

The preparation method of the ink for ink jetting is described in detail in JP-A-5-148436, JP-A-5-295312, JP-A7-97541, JP-A-7-82515 and JP-A-7-118584 and those described in these patent publications can be utilized also in the preparation of the inkjet recording ink of the present invention.

In the inkjet recording ink of present invention, additives such as drying inhibitor for preventing clogging due to drying of ink at the ejection port, permeation accelerator for attaining more successful permeation of ink into paper, ultraviolet absorbent, antioxidant, viscosity adjusting agent, surface tension adjusting agent, dispersant, dispersion stabilizer, fungicide, rust inhibitor, pH adjusting agent, defoaming agent and chelating agent can be appropriately selected and used in an appropriate amount.

The drying inhibitor for use in the present invention is preferably a water-soluble organic solvent having a vapor pressure lower than water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyriolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in the ink in an amount of 10 to 50 wt %.

Examples of the permeation accelerator for use in the present invention include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 wt % of the permeation accelerator in the ink. The permeation accelerator is preferably used in an amount of causing no bleeding of printed letter or no print through.

In the present invention, an ultraviolet absorbent is used for improving the preservability of image and examples of the ultraviolet absorbent which can be used include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JR-A-10-182621 and JP-T-8-501291 (the term "JP-T" as used herein means a "published Japanese translation of a PCT patent application"), compounds described in Research Disclosure No. 24239, and compounds of absorbing ultraviolet light and emitting fluorescent light, so-called fluorescent brightening agents, represented by stilbene-base compounds and benzoxazole-base compounds.

In the present invention, an antioxidant is used for improving the preservability of image and various organic and metal complex-base discoloration inhibitors can be used therefor. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used, Examples of the fungicide for use in the present invention include sodium dehydroacetate, sodium benzoate, sodium pyridinethione-1-oxide, ethyl p-hydroxybenzoate, 1,2-benzisothiazolin-3-one and salts thereof. The fungicide is preferably used in the ink in an amount of 0.02 to 5.00 wt %.

These are described in detail in *Bokin aobai Zai Jiten* (*Dictionary of Microbicide and Fungicide*), compiled by Nippon Bokin Sobai Gakkai Jiten Henshu Iinkai, Examples of the rust inhibitor include acidic sulfite, sodium thiosulfate, ammon thioglycolate, diisopropylammonium nitrite, pentaerythritol tetranitrate, dicyclohexylammonium nitrite and benzotriazole. The rust inhibitor is preferably used in the ink in an amount of 0.02 to 5.00 wt %.

The pH adjusting agent for use in the present invention is suitably used for adjusting the pH and imparting dispersion stability. The pH of the ink is preferably adjusted to 8 to 11 at 25° C. If the pH is less than 8, the solubility of dye decreases to readily cause clogging of a nozzle, whereas if it exceeds 11, the water resistance is liable to deteriorate. Examples of the pH adjusting agent include, as basic one, organic bases and inorganic alkalis, and as acidic one, organic acids and inorganic acids.

Examples of the basic compound which can be used include inorganic compounds such as sodium hydroxide, potassium hydroxide, sodium carbonate, potassium carbonate, sodium hydrogencarbonate, potassium hydrogencarbonate, sodium acetate, potassium acetate, sodium phosphate and sodium monohydrogenphosphate; and organic bases such as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine and collidine.

Examples of the acidic compound which can be used include inorganic compounds such as hydrochloric acid, sulfuric acid, phosphoric acid, boric acid, sodium hydrogensulfate, potassium hydrogensulfate, potassium dihydrogenphosphate and sodium dihydrogenphosphate; and organic compounds such as acetic acid, tartaric acid, benzoic acid, trifluoroacetic acid, methanesulfonic acid, ethanesulfonic acid, benzenesulfonic acid, p-toluenesulfonic acid, saccharinic acid, phthalic acid, picolinic acid and quinolinic acid.

The conductivity of the ink of the present invention is from 0.01 to 10 S/m, preferably from 0.05 to 5 S/m.

The conductivity can be measured by an electrode method using a commercially available saturated potassium chloride.

The conductivity can be controlled mainly by the ion concentration in a water-base solution. In the case where the salt concentration is high, desalting can be performed by using ultrafiltration membrane or the like. Also, in the case of controlling the conductivity by adding a salt or the like, the conductivity can be controlled by adding various organic or inorganic salts.

Examples of the inorganic salt which can be used include inorganic compounds such as potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogenphosphate, boric acid, potassium dihydrogenphosphate and sodium dihydrogenphosphate. Also, organic compounds such as sodium acetate, potassium acetate, potassium tartrate, sodium tartrate, sodium benzoate, potassium benzoate, sodium p-toluenesulfonate, potassium saccharinate, potassium phthalate and sodium picolinate can be used.

The conductivity can also be controlled by selecting other additive components.

The viscosity at 25° C. of the ink of the present invention is from 1 to 20 mPa·s, preferably from 2 to 15 mPa·s, more preferably from 2 to 10 mPa·s. If the viscosity exceeds 30 mPa·s, the fixing rate of the recorded image decreases and the ejection performance also decreases, whereas if it is less than 1 mPa·s, the recorded image is blurred and therefore, decreased in the grade.

The viscosity can be freely adjusted by the amount of the ink solvent added. Examples of the ink solvent include glycerin, diethylene glycol, triethanolamine, 2-pyrrolidone, diethylene glycol monobutyl ether and triethylene glycol monobutyl ether.

A viscosity adjusting agent may also be used. Examples of the viscosity adjusting agent include celluloses, water-soluble polymers such as polyvinyl alcohol, and nonionic surfactants. These are described in detail in *Nendo Chosei Gijutsu* (*Viscosity Adjusting Technology*), Chap. 9, Gijutsu Joho Kyokai (1999), and *Inkjet Printer Yo Chemicals* (98 *Zoho*)—*Zairyo no Kaihatsu Doko•Tenbo Chosa*—(*Chemicals for Inkjet Printer* (*Enlarged Edition of* 98)—*Survey on Tendency•Prospect of Development of Materials*—), pp. 162-174, CMC (1997).

The method for measuring the viscosity of liquid is described in detail in JIS Z8803 but the viscosity can be easily measured by a commercially available viscometer. For example, the rotational viscometer includes B-type viscometer and E-type viscometer, manufactured by Tokyo Keiki Co. In the present invention, the viscosity is measured at 25° C. by using a vibrating viscometer Model VM100A-L manufactured by Yamaichi Denki. The unit of viscosity is pascal second (Pa·s) but usually, milli-pascal second (mPa·s) is used.

Whichever dynamic surface tension or static surface tension is used, the surface tension of the ink for use in the present invention is preferably from 20 to 50 mN/m, more preferably from 20 to 40 mN/m, at 25° C. If the surface tension exceeds 50 mN/m, ejection stability and printing quality are seriously deteriorated, for example, bleeding at color mixing or feathering is caused, whereas if the surface tension of ink is less than 20 mN/m, printing failure may occur due to attachment of ink to the surface of hardware at the ejection.

For the purpose of adjusting the surface tension, a cationic, anionic or nonionic surfactant of various types described above can be added. The surfactant is preferably used in the range from 0.01 to 20 wt %, more preferably from 0.1 to 10 wt %, based on the ink for ink jetting. The surfactants can be used in combination of two or more thereof.

As the method for measuring the static surface tension, a capillary elevation method, a dropping method, a suspended ring method and the like are known. In the present invention, a vertical plate method is used as the method for measuring the static surface tension.

When a glass or platinum thin plate is vertically hung while dipping a part of the plate in a liquid, a surface tension of the liquid acts downward along the contact portion between the liquid and the plate. This force is balanced with an upward force and thereby, the surface tension can be measured.

As the method for measuring the dynamic surface tension, a vibrating jet method, a meniscus dropping method, a maximum bubble pressure method and the like are known as described, for example, in *Shin Jikken Kagaku Koza, Kaimen to Colloid* (*New Lecture of Experimental Chemistry, Interface and Colloid*), Vol. 18, pp. 69-90, Maruzen (1977). Furthermore, a liquid film rupturing method described in JP-A-3-2064 is known. In the present invention, a differential bubble pressure method is used as the method for measuring the dynamic surface tension. The principle and method of the measurement are described below.

When a bubble is produced in a solution rendered uniform by stirring, a gas-liquid interface is newly produced and surfactant molecules in the solution gather to the water surface at a constant speed. When the bubble rate (bubble production rate) is changed, as the production rate decreases, a larger number of surfactant molecules gather to the bubble surface. Therefore, the maximum bubble pressure immediately before the bubble bursts becomes small and the maximum bubble pressure (surface tension) for the bubble rate can be detected. The dynamic surface tension is preferably measured by a method of producing bubbles in a solution using large and small two probes, measuring the differential pressure in the maximum bubble pressure state between two probes, and calculating the dynamic surface tension.

The nonvolatile component in the ink of the present invention is preferably from 10 to 70 wt % of the entire amount of the ink in view of ejection stability of ink, printed image quality, various fastnesses of image or reduction in blurring of image after printing or in stickiness on the printed surface. The nonvolatile component is more preferably from 20 to 60 wt % in view of ejection stability of ink and reduction in blurring of image after printing.

The nonvolatile component as used herein means a liquid or solid component having a boiling point of 150° C. or more at 1 atm or a high molecular amount component. The nonvolatile component in the inkjet recording ink includes a dye and a high boiling point solvent and also includes a polymer latex, a surfactant, a dye stabilizer, a fungicide and a buffering agent which are added, if desired. Many of these nonvolatile components except for the dye stabilizer reduce the dispersion stability of ink and even after printing, remain on the inkjet image-receiving paper to inhibit the aggregation and in turn stabilization of dye on the image-receiving paper and worsen various fastnesses of the image area or blurring of the image under high humidity condition.

In the present invention, a high molecular amount compound may also be contained. The high molecular amount compound as used herein means all polymer compounds having a number average molecular weight of 5,000 or more contained in the ink. Examples of the polymer compound include a water-soluble polymer compound which substantially dissolves in an aqueous medium, a water-dispersible polymer compound such as polymer latex and polymer emulsion, and an alcohol-soluble polymer compound which dissolves in a polyhydric alcohol used as an auxiliary solvent, however, the high molecular weight compound as used in the present invention includes all polymer compounds which substantially dissolve or disperse uniformly in the ink solution.

Specific examples of the water-soluble polymer compound include water-soluble polymers such as polyvinyl alcohol, silanol-modified polyvinyl alcohol, carboxymethyl cellulose, hydroxyethyl cellulose, polyvinylpyrrolidone, polyalkylene oxide (e.g., polyethylene oxide, polypropylene oxide) and polyalkylene oxide derivatives; natural water-soluble polymers such as polysaccharides, starch, cationized starch, casein and gelatin; aqueous acrylic resins such as polyacrylic acid, polyacrylamide and copolymers thereof; aqueous alkyd resin; and water-soluble polymer compounds having a —$SO_3^-$ or —$COO^-$ group within the molecule and substantially dissolvable in an aqueous medium.

Specific examples of the polymer latex include a styrene-butadiene latex, a styrene-acryl latex and a polyurethane latex, and specific examples of the polymer emulsion include an acryl emulsion.

These water-soluble polymer compounds can be used individually or in combination of two or more thereof.

As described above, the water-soluble polymer compound is used as the viscosity adjusting agent so as to adjust the viscosity of ink to a viscosity region of giving good ejection property, however, if the amount of the water-soluble polymer compound added is large, the viscosity of ink increases to reduce the ejection stability of ink solution and after aging of ink, the nozzle is readily clogged by the precipitate.

The amount added of the polymer compound as the viscosity adjusting agent varies depending on the molecular weight of the compound added (as the molecular weight is higher, the amount added can be smaller), but the amount added is from 0 to 5 wt %, preferably from 0 to 3 wt %, more preferably from 0 to 1 wt %, based on the entire amount of ink, In the present invention, apart from the above-described surfactant, a nonionic, cationic or anionic surfactant is used as the surface tension adjusting agent. Examples of the anionic surfactant include a fatty acid salt, an alkylsulfuric ester salt, an alkylbenzenesulfonate, an alkylnaphthalenesulfonate, a dialkylsulfosuccinate, an alkylphosphoric ester salt, a naphthalenesulfonic acid formalin condensate and a polyoxyethylenealkylsulfuric ester salt. Examples of the nonionic surfactant include a polyoxyethylene alkyl ether, a polyoxyethylene alkylallyl ether, a polyoxyethylene fatty acid ester, a sorbitan fatty acid ester, a polyoxyethylene sorbitan fatty acid ester, a polyoxyethylene alkylamine, a glycerin fatty acid ester and an oxyethylene oxypropylene block copolymer. Also, SURFYNOLS (produced by Air Products & Chemicals), which is an acetylene-base polyoxyethylene oxide surfactant, is preferably used. In addition, amine oxide-type amphoteric surfactants such as N,N-dimethyl-N-alkylamine oxide are preferred. Furthermore, surfactants described in JP-A-59-157636 (pages (37) to (38)) and *Research Disclosure*, No. 308119 (1989) can be used.

In the present invention, if desired, various cationic, anionic or nonionic surfactants described above may be used as a dispersant or a dispersion stabilizer, and a fluorine- or silicone-base compound or a chelating agent represented by EDTA may be used as a defoaming agent.

The recording paper and recording film for use in the present invention are described below.

The support which can be used for the recording paper or film is produced, for example, from a chemical pulp such as LBKP and NBKP, a mechanical pulp such as GP, PGW, RMP, TMP, CTMP, CMP and CGP, a waste paper pulp such as DIP, by mixing, if desired, conventionally known additives such as pigment, binder, sizing agent, fixing agent, cation agent and paper strength increasing agent, and then sheeting the mixture using various devices such as Fourdrinier paper machine and cylinder paper machine. Other than these supports, synthetic paper or plastic film may be used as the support. The thickness of the support is preferably from 10 to 250 μm and the basis weight is preferably from 10 to 250 g/m$^2$.

An image-receiving layer and a backcoat layer may be provided on the support as it is to produce an image-receiving material for the ink of the present invention, or an image-receiving layer and a backcoat layer may be provided after providing a size press or anchor coat layer using starch, polyvinyl alcohol or the like, to produce an image-receiving material. The support may also be subjected to a flattening treatment by a calendering device such as machine calender, TG calender and soft calender.

In the present invention, the support is preferably paper or plastic film of which both surfaces are laminated with polyolefin (for example, polyethylene, polystyrene, polybutene or a copolymer thereof) or polyethylene terephthalate. In the polyolefin, a white pigment (for example, titanium oxide or zinc oxide) or a tinting dye (for example, cobalt blue, ultramarine or neodymium oxide) is preferably added.

The image-receiving layer provided on the support contains a porous material and an aqueous binder. Also, the image-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production method (gas phase method) or a silicic acid hydrate obtained by a wet production method.

Specific examples of the recording paper containing the pigment in the image-receiving layer, which can be used, include those disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2098, JP-A-8-174992, JP-A-11-192777 and JP-A-2001-301314.

Examples of the aqueous binder contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivatives, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in the present invention in view of adhesion to the pigment and separation resistance of the ink-accepting layer.

The image-receiving layer may contain a mordant, a water-proofing agent, a light fastness enhancer, a gas resistance enhancer, a surfactant, a hardening agent and other additives in addition to the pigment and the aqueous binder.

The mordant added to the image-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, TP-A-60-23850, JP-A-60-23851, JP-A-60-23852, JP-A60-23853, JP-A-60-578368 JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A1-161236 (pages 212 to 215) is particularly preferred. When the polymer mordant described in this patent publication is used, an image having excellent image quality can be obtained and at the same time, light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride and cation polyacrylamide. The content of the cationic resin is preferably from 1 to 15 wt %, more preferably from 3 to 10 wt %, based on the entire solid content of the ink-accepting layer.

Examples of the light fastness enhancer and the gas resistance enhancer include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharides, water-soluble reducing compounds, organic acids, inorganic acids, hydroxy group-containing organic acids, benzotriazole compounds, benzophenone compounds, triazine compounds, heterocyclic compounds, water-soluble metal salts, organic metal compounds and metal complexes.

Specific examples of these compounds include those described in JP-A-10-182621, JP-A-2001-260519, JP-A-2000-260519, JP-B-4-34953, JP-B-4-34513, JP-B-4-34512, JP-A-11-170686, J?-A-60-67190, JP-A-7-276808, JP-A-2000-94829, JP-T-8-512258 and JP-A-11-321090.

The surfactant functions as a coating aid, a releasability improver, a slipperiness improver or an antistatic agent. The surfactant is described in JP-A-62-173463 and JP-A-62-183457.

In place of the surfactant, an organic fluoro compound may be used. The organic fluoro compound is preferably hydrophobic. Examples of the organic fluoro compound include fluorine-containing surfactants, oily fluorine-base compounds (for example, fluorine oil) and solid fluorine compound resins (for example, ethylene tetrafluoride resin). The organic fluoro compound is described in JP-B-57-9053 (columns 8 to 17), JP-A-61-20994 and JP-A-62-135826.

As the hardening agent, the materials described, for example, in JP-A-1-161236 (page 222), JP-A-9-263036, JP-A10-119423 and JP-A-2001-310547 can be used.

Other additives added to the image-receiving layer include a pigment dispersant, a thickener, a defoaming agent, a dye, a fluorescent brightening agent, an antiseptic, a pH adjusting agent, a matting agent, a hardening agent and the like. The ink-accepting layer may be composed of either one layer or two layers.

In the recording paper or film, a backcoat layer may also be provided. Examples of the component which can be added to this layer include a white pigment, an aqueous binder and other components.

Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include. Water-soluble polymers such as styrene/maleate copolymer, styrenelacrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex- and acryl emulsion. Other components contained in the backcoat layer include a defoaming agent, a foam inhibitor, a dye, a fluorescent brightening agent, an antiseptic, a water-proofing agent and the like.

In a constituent layer (including the back layer) of the inkjet recording paper or film, a polymer fine particle dispersion may be added. The polymer fine particle dispersion is used for the purpose of improving film properties, for example, stabilizing the dimension and preventing curling, adhesion or film cracking. The polymer fine particle dispersion is described in JP-A-62-245258, JP-A-62-136648 and JP-A-62-110066. When a polymer fine particle dispersion having a low glass transition temperature (40° C. or less) is added to a layer containing a mordant, the layer can be prevented from cracking or curling. The curling can be prevented also by adding a polymer fine particle dispersion having a high glass transition temperature to a back layer.

The inkjet recording ink of the present invention can be used for uses other than the inkjet recording, such as a material for display image, an image-forming material for interior decoration and an image-forming material for outdoor decoration, Examples of the material for display image include various materials such as poster, wall paper, ornamental goods (e.g., ornament, doll), handbill for commercial advertisement, wrapping paper, wrapping material, paper bag, vinyl bag, package material, billboard, image drawn or attached to the side face of traffic (e.g., automobile, bus, electric car), and clothes with a logo. In the case of using the dye of the present invention as a material for forming a display image, the image includes not only a strict image but also all patterns formed by a dye, which can be acknowledged by a human, such as abstract design, letter and geometrical pattern.

Examples of the material for interior decoration include various materials such as wall paper, ornamental goods (e.g., ornament, doll), luminaire member, furniture member, and design member of floor or ceiling. In the case of using the dye of the present invention as a material for forming an image, the image includes not only a strict image but also all patterns formed by a dye, which can be acknowledged by a human, such as abstract design, letter and geometrical pattern.

Examples of the material for outdoor decoration include various materials such as wall material, roofing material, billboard, gardening material, outdoor ornamental goods (e.g., ornament, doll), and outdoor luminaire member. In the case of using the dye of the present invention as a material for forming an image, the image includes not only a strict image but also all patterns formed by a dye, which can be acknowledged by a human, such as abstract design, letter and geometrical pattern.

In these uses, examples of the medium where the pattern is formed include various materials such as paper, fiber, cloth (including non-woven fabric), plastic, metal and ceramic. Examples of the dyeing form include mordanting, printing and fixing of a dye in the form of a reactive dyestuff having introduced thereinto a reactive group. Among these, preferred is dyeing by mordanting.

In the production of the inkjet recording ink of the present invention, ultrasonic vibration may be added, for example, in the step of dissolving additives such as dye.

The ultrasonic vibration is added so as to prevent the ink from generating a bubble due to a pressure applied in the recording head. More specifically, an ultrasonic energy equal to or greater than the energy imposed in the recording head is previously applied in the process of producing the ink to thereby remove a bubble.

The ultrasonic vibration is usually an ultrasonic wave having a frequency of 20 kHz or more, preferably 40 kHz or more, more preferably 50 kHz or more. The energy added to liquid by the ultrasonic vibration is usually $2\times10^7$ J/m$^3$ or more, preferably $5\times10^7$ J/m$^3$ or more, more preferably $1\times10^8$ J/m$^3$ or more. The time period where the ultrasonic vibration is applied is usually on the order from 10 minutes to one hour.

No matter when the step of adding ultrasonic vibration is performed, the effect can be attained as long as it is performed after the dye is charged into a medium. The effect is also provided even by adding ultrasonic vibration after the finished ink is once stored. However, the ultrasonic vibration is preferably added at the time of dissolving and/or dispersing the dye in a medium, because the effect of removing a bubble is large and the dissolution and/or dispersion of a dyestuff in a medium is accelerated by the ultrasonic vibration.

That is, the stop of adding at least ultrasonic vibration can be performed during or after the step of dissolving and/or dispersing the dye in a medium. In other words, the step of adding at least ultrasonic vibration can be optionally performed once or more after the preparation of ink until the ink is finished as a product.

In a practical embodiment, the step of dissolving and/or dispersing the dye in a medium preferably comprises a step of dissolving the dye in a partial medium out of the entire medium and a step of mixing the remaining medium. The ultrasonic vibration is preferably added at least in either one of these steps, more preferably in the step of dissolving the dye in a partial medium out of the entire medium.

The step of mixing the remaining solvent may be a single step or a multiple step.

In the production of ink of the present invention, a degassing step under heating or reduced pressure is preferably used in combination, because the effect of removing a bubble in the ink is enhanced. The degassing step under heating or reduced pressure is preferably performed simultaneously with or after the step of mixing the remaining medium.

Examples of the ultrasonic vibration-generating means for use in the step of adding ultrasonic vibration include known devices such as ultrasonic disperser.

In the production of the inkjet recording ink of the present invention, the step of removing dusts as the solid content by filtration, which is performed after the preparation of ink solution, is important. This operation is performed by using a filtration filter and the filtration filter used here is a filter having an effective size of 1 μm or less, preferably from 0.05 to 0.3 μm, more preferably from 0.25 to 0.3 μm. For the construction material of the filter, various materials can be used, however, in the case of an ink using a water-soluble dye, a filter produced for aqueous solvents is preferably used. In particular, a filter made of a polymer material, which less generates wastes, is preferred. The filtration may be performed by feeding and passing the solution through a filter, and filtration under pressure or filtration under reduced pressure either can be used.

After the filtration, air is often taken in into the solution. A bubble ascribable to this air also gives rise to the disorder of image in the inkjet recording in many cases and therefore, the above-described defoaming step is preferably provided as a separate step. For the defoaming, a method of allowing the solution after filtration to stand may be used or various methods such as ultrasonic defoaming or reduced-pressure defoaming using a commercially available device can be utilized. In the case of defoaming by an ultrasonic wave, the defoaming operation is preferably performed for 30 seconds to 2 hours, more preferably on the order from 5 minutes to one hour.

This operation is preferably performed using a space such as clean room or clean bench so as to prevent mingling of dusts at the operation. In the present inventions this operation is preferably performed in a space having a cleanness degree of class 1,000 or less. The "cleanness degree" as used herein means a value measured by a dust counter.

In the present invention, the hitting volume of ink on a recording material is preferably from 0.1 to 100 μl, more preferably from 0.5 to 50 pl, still more preferably from 2 to 50 pl.

The present invention is not limited in the ink-jet recording system and is used for a known system, for example, an electric charge controlling system of jetting out the ink by making use of the electrostatic induction force, a drop-on-demand system (pressure pulse system) of using an oscillation pressure of a piezo element, an acoustic inkjet system of converting electric signals into acoustic beams, irradiating the beams on the ink and jetting out the ink by making use of the radiation pressure, and a thermal inkjet (bubble jet) system of heating the ink to form a bubble and utilizing the generated pressure.

The inkjet recording system includes a system of ejecting a large number of small-volume ink droplets of a so-called photo ink having a low concentration, a system of using a plurality of inks substantially the same in the color hue but different in the concentration and thereby improving the image quality, and a system using a colorless transparent ink. The hitting volume of ink is controlled mainly by the printer head.

For example, in the case of a thermal inkjet system, the hitting volume can be controlled by the structure of the printer head. That is, the ink can be hit in a desired size by changing the ink chamber, heating section and nozzle size. Also, even in the thermal inkjet system, the ink can be hit in a plurality of sizes by providing a plurality of printer heads differing in the heating section or nozzle size.

In the case of a drop-on-demand system using a piezo element, the hitting volume can be changed by the structure of printer head similarly to the thermal inkjet system, however, as described later, the ink can be hit in a plurality of sizes with printer heads having the same structure by controlling the waveform of driving signals for driving the piezo element.

In the present invention, the ejection frequency on hitting the ink on a recording material is preferably 1 KHz or more.

In order to record a high-quality image like a photograph, the hitting density must be 600 dpi (number of dots per inch) or more so that an image having high sharpness can be reproduced by a small ink droplet.

In hitting the ink by a head having a plurality of nozzles, the number of heads which can be driven at the same time is restricted, that is, from a few tens to about 200 in the type where a recording paper and a head are moved in the directions orthogonal to each other, and a few hundreds even in the type called line head where the head is fixed. This is because the driving electric power is limited or due to the effect of heat generated in the head on the image, a large number of head nozzles cannot be simultaneously driven. Therefore, in the case of recording an image at a high hitting density, the recording time is liable to be prolonged, however, the recording speed can be increased by elevating the driving frequency.

The hitting frequency can be controlled, in the case of a thermal inkjet system, by controlling the frequency of head-driving signal for heating the head.

In the case of a piezo system, the hitting frequency can be controlled by controlling the frequency of signal for driving the piezo.

The driving of piezo head is described. The hitting size, hitting speed and hitting frequency are determined in a printer control section based on the signal of an image to be printed, and a signal for driving a printer head is prepared. The driving signal is supplied to the printer head and by the signal for driving the piezo, the hitting size, hitting speed and hitting frequency are controlled. Here, the hitting size and hitting speed are determined by the shape and amplitude of the driving waveform, and the frequency is determined by the cycle period of signal.

When the hitting frequency is set to 10 KHz, the head is driven every 100 micro-seconds and one-line recording is completed in 400 micro-seconds. When the travelling speed of the recording paper is set such that the recording paper moves 1/600 inch, namely, about 42 micron per 400 micro-seconds, the printing can be attained at a rate of one sheet per 1.2 seconds.

With respect to the printing apparatus or printer where the inkjet recording ink of the present invention is used, the constitution disclosed, for example, in JP-A-11-170527 is suitably used, With respect to the ink cartridge, the constitution disclosed, for example, in JP-A-5-229133 is suitably used. With respect to the suction and the cap or the like covering the printing head 28 at the suction, the constitutions disclosed, for example, in JP-A-7-276671 are suitably used. In the vicinity of head, a filter for eliminating a bubble, disclosed in JP-A-9-277552, is suitably provided.

Also, the surface of nozzle is suitably subjected to a water repellent treatment described in Japanese Patent Application No. 2001-016738. The present invention may be used for a printer connected to a computer or for an apparatus specialized to print a photograph.

The inkjet recording ink of the present invention is preferably hit on a recording material at an average hitting speed of 2 m/sec or more, more preferably 5 m/sec or more.

The hitting speed is controlled by controlling the shape and amplitude of the waveform for driving the head.

Furthermore, by using a plurality of driving waveforms and selecting an appropriate waveform, the ink can be hit in a plurality of sizes with the same printer head.

EXAMPLES

The present invention is described below by referring to Examples, however, the present invention is not limited thereto.

Example

Deionized water was added to the following components to make 1 liter and the resulting solution was stirred for 1 hour under heating at 30 to 40° C. Thereafter, the solution was filtered under reduced pressure through a microfilter having an average pore size of 0.25 μm to prepare an ink solution for light cyan color.

| | |
|---|---|
| Phthalocyanine dye (154) | 17.5 g/liter |
| Diethylene glycol | 150 g/liter |
| Urea | 37 g/liter |
| Glycerin | 130 g/liter |
| Triethylene glycol monobutyl ether | 130 g/liter |
| Triethanolamine | 6.9 g/liter |
| Benzotriazole | 0.08 g/liter |
| PROXEL XL2 | 3.5 g/liter |
| SURFYNOL STG | 10 g/liter |

Also, an ink solution for cyan color was prepared by increasing the amount of the cyan dye (154) to 68 g/liter in the formulation above. Based on these cyan and light cyan inks, inks were produced by changing the counter cation of the cyan dye as shown below and changing the pH adjusting agent triethanolamine (TEA) to the inorganic base shown below (in all inks, the mother nucleus of the cyan dye (154) was the same).

TABLE 12

| Ink No. | Light Cyan Ink | Cyan Ink |
|---|---|---|
| 101 (Invention) | Dye counter cation: Li<br>Base: TEA | Dye counter cation: Li<br>Base: TEA |
| 102 (Invention) | Dye counter cation: Li<br>Base: LiOH | Dye counter cation: Li<br>Base: LiOH |
| 103 (Comparative Example) | Dye counter cation: K<br>Base: TEA | Dye counter cation: K<br>Base: TEA |
| 104 (Comparative Example) | Dye counter cation: K<br>Base: KOH | Dye counter cation: K<br>Base: KOH |
| 105 (Comparative Example) | Dye counter cation: Na<br>Base: TEA | Dye counter cation: Na<br>Base: TEA |
| 106 (Comparative Example) | Dye counter cation: Na<br>Base: NaOH | Dye counter cation: Na<br>Base: NaOH |

The cations in these inks were measured by ion chromatography (manufactured by Shimadzu Corporation), as a result, cations other than the cations of the present invention were not detected in Inks 101 and 102. On the other hand, in Inks 103 to 106, undesired sodium ion and potassium ion which are not the cations of the present invention were detected and the content thereof is 0.5 to 0.7 wt % of potassium ion (Ink 103), 1.2 wt % of potassium ion (Ink 104), 0.5 to 0.6 wt % of sodium ion (Ink 105) and 1.0 wt % of sodium ion (Ink 106).

Then these Inks 101 to 106 each was filled in a cyan•light cyan ink parts of a cartridge of an ink-jet printer PM950C (manufactured by Seiko Epson Corporation) and an image was printed on inkjet paper Photo-Gloss Paper EX produced by Fuji Photo Film Co., Ltd. in the printer and evaluated on the image fastness.

As for the image preservability, a solid image printed sample of cyan, where the density was stepwise changed, was prepared and evaluated on the following matters.

(i) The light fastness was evaluated as follows. The image density Ci immediately after printing was measured by X-Rite 310 and thereafter, xenon light (85,000 lx) was irradiated on the image for 10 days using a weather meter manufactured by Atlas. The image density Cf was again measured and the dye residual percentage Ci/Cf*100 was determined and evaluated. The dye residual percentage was evaluated at three points having a reflection density of 1, 1.5 and 2. The light fastness was rated A when the dye residual percentage was 70% or more at all density points, rated 8 when less than 70% at two points, and rated C when less than 70% at all density points.

(ii) The heat fastness was evaluated as follows. The sample was stored for 10 days under the conditions of 80° C. and 70% RH and the density before and after the storage was measured by X-Rite 310. The dye residual percentage was determined and evaluated. The dye residual percentage was evaluated at three points having a reflection density of 1, 1.5 and 2. The heat fastness was rated A when the dye residual percentage was 90% or more at all density points, rated B when less than 90% at two points, and rated C when less than 90% at all density points.

(iii) The ozone resistance was evaluated as follows. The Photo-Gloss Paper having formed thereon an image was left standing in a box set to an ozone gas concentration of 0.5 ppm for 7 days and the image density before and after the standing in an ozone gas was measured by a reflection densitometer (X-Rite 310TR) and evaluated as the dye residual percentage the dye residual percentage was evaluated at three points having a reflection density of 1, 1.5 and 2. The ozone concentration in the box was set by using an ozone gas monitor (Model OZG-EM-01, manufactured by APPLICS). The ozone resistance was evaluated by three-stage rating, that is, rated A when the dye residual percentage was 80% or more at all density points, rated B when less than 80% at two points, and rated C when less than 70% at all density points.

(iv) The bronze luster was rated X when bronze luster was observed at a reflection density of 2.2 or more in the stepwise printed area, and rated Q when not observed.

In all evaluations, a genuine ink (cyan part) of PM950C was used as an ink for comparison.

The results are shown in Table 13.

TABLE 13

| | Light Fastness | Heat Fastness | Ozone Fastness | Bronze Luster |
|---|---|---|---|---|
| PM-950C | B | B | C | ○ |
| 101 | A | A | A | ○ |
| 102 | A | A | A | ○ |
| 103 | A | A | A | X |
| 104 | A | A | A | X |
| 105 | A | A | A | X |
| 106 | A | A | A | X |

It is seen that the ink of the present invention ensures excellent weather resistance (in all of light fastness/heat fastness and ozone fastness) and also that when the ink of the present invention is used, bronze luster is not generated.

According to the present invention, an ink-jet recording ink of giving an image excellent in the weather resistance such as light fastness, heat fastness and ozone fastness and favored with high image quality free from bronze luster can be provided.

This application is based on Japanese patent application JP 2002-279155, filed on Sep. 25, 2002, the entire content of which is hereby incorporated by reference, the same as if set forth at length.

What is claimed is:

1. An inkjet recording ink comprising an aqueous medium having dissolved therein a dye represented by the following formula (I), which is water-soluble and contains a lithium ion as a counter ion, wherein the total amount of a cation in said ink except for a lithium ion, a hydrogen ion, an ammonium ion, an organic quaternary nitrogen ion and an ion produced by proton addition to a nitrogen atom in a basic organic material is 0.5 wt % or less:

Formula (I)

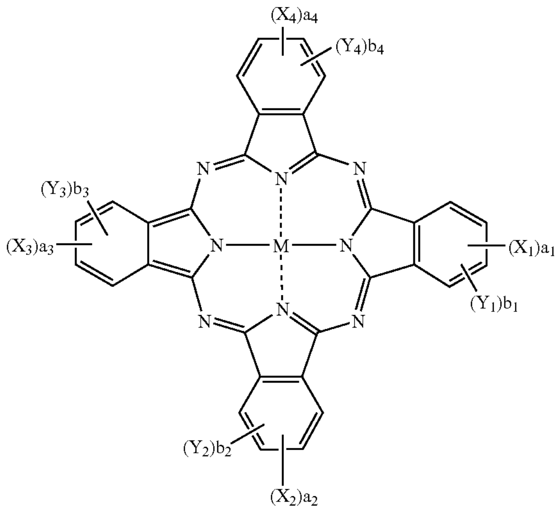

wherein $X_1$, $X_2$, $X_3$ and $X_4$ each independently represents —SO-Z, —$SO_2$-Z, —$SO_2NR_1R_2$, a sulfo group, —$CONR_1R_2$ or —$CO_2R_1$, and at least one of $X_1$, $X_2$, $X_3$, and $X_4$ represents —$SO_2$-Z or —$SO_2NR_1R_2$; Z represents a substituted or unsubstituted alkyl group, a substituted or unsubstituted cycloalkyl group, a substituted or unsubstituted alkenyl group, a substituted or unsubstituted aralkyl group, or a substituted or unsubstituted heterocyclic group; $R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group or a substituted or unsubstituted heterocyclic group, and when a plurality of Zs are present, the Zs may be the same or different; $Y_1$, $Y_2$, $Y_3$ and $Y_4$ each independently represents a monovalent substituent, and when a plurality of $X_1$s, $X_2$s, $X_3$s, $X_4$s, $Y_1$s, $Y_2$s, $Y_3$s or $Y_4$s are present, the $X_1$s, $X_2$s, $X_3$s, $X_4$s, $Y_1$s, $Y_2$s, $Y_3$s or $Y_4$s may be the same or different; $a_1$ to $a_4$ and $b_1$ to $b_4$ represent the number of substituents $X_1$ to $X_4$ and $Y_1$ to $Y_4$, respectively; $a_1$ to $a_4$ each independently represents an integer of 0 to 4 but all of $a_1$ to $a_4$ are not 0 at the same time; $b_1$ to $b_4$ each independently represents an integer of 0 to 4; M represents a hydrogen atom, a metal atom, or an oxide, hydroxide or halide thereof.

2. The inkjet recording ink as described in claim 1, wherein the dye represented by formula (I) is a dye represented by the following formula (II):

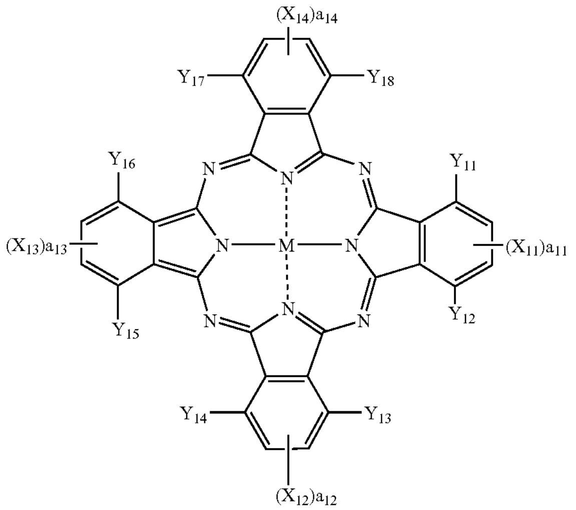

wherein $X_{11}$ to $X_{14}$, $Y_{11}$ to $Y_{14}$ and M have the same meanings as $X_1$ to $X_4$, Y, to $Y_4$ and N in the formula (I), respectively, and $a_{11}$ to $a_{14}$ each independently represents an integer of 1 or 2.

3. The inkjet recording ink as described in claim 1, which further comprises a hydrogen ion.

4. The inkjet recording ink as described in claim 1, wherein the cation in said ink except for a lithium ions a hydrogen ion, an ammonium ion, an organic quaternary nitrogen ion and an ion produced by the proton addition to a nitrogen atom in a basic organic material is at least one selected from the group consisting of a potassium ion, a sodium ion, a cesium ion, a magnesium ion, a zinc ion, a calcium ion, a strontium ion, an aluminum ion and a transition metal ion.

5. The inkjet recording ink as described in claim 1, wherein the cation in said ink except for a lithium ion, a hydrogen ion, an ammonium ion, an organic quaternary nitrogen ion and an ion produced by the proton addition to a nitrogen atom in a basic organic material is at least one of a potassium ion and a sodium ion.

6. The inkjet recording ink described in claim 1, wherein the dye has an ionic hydrophilic group.

7. The inkjet recording ink described in claim 1, wherein the dye has at least two hydrophilic groups within one molecule.

8. The inkjet recording ink described in claim 1, wherein the dye has an ionic hydrophilic group selected from the group consisting of a carboxyl group, a phosphono group and a sulfo group.

9. The inkjet recording ink as described in claim 2, wherein in formula (II) $Y_{11}$ to $Y_{18}$ each independently represents a hydrogen atom, a halogen atom, an alkyl group, an aryl group, a cyano group, an alkoxy group, an amido group, a ureido group, a sulfonamide group, a carbamoyl group, a sulfamoyl group, an alkoxycarbonyl group, a carboxyl group or a sulfo group.

10. The inkjet recording ink as described in claim 2, wherein in formula (II) $Y_{11}$ to $Y_{18}$ represents a hydrogen atom.

11. The inkjet recording ink as described in claim 1, wherein the dye represented by formula (I) is present in an amount of 0.2 to 20 wt %.

12. The inkjet recording ink as described in claim 2, wherein the dye represented by formula (II) is present in an amount of 0.2 to 20 wt %.

13. The inkjet recording ink as described in claim 1, wherein glycerin is present in an amount of 10 to 50 wt %.

* * * * *